US005258586A

United States Patent [19]

Suzuki et al.

[11] Patent Number: 5,258,586

[45] Date of Patent: Nov. 2, 1993

[54] ELEVATOR CONTROL SYSTEM WITH IMAGE PICKUPS IN HALL WAITING AREAS AND ELEVATOR CARS

[75] Inventors: Masato Suzuki, Ibaraki; Masachika Yamazaki, Katsuta; Hiromi Inaba, Katsuta; Kiyoshi Nakamura, Katsuta; Yoshio Sakai, Ibaraki; Naofumi Nakata, Katsuta; Chikara Komatsu, Katsuta; Syoji Kasai, Katsuta; Atsuya Fujino, Hitachi, all of Japan

[73] Assignee: Hitachi, Ltd., Tokyo, Japan

[21] Appl. No.: 496,294

[22] Filed: Mar. 20, 1990

[30] Foreign Application Priority Data

Mar. 20, 1989 [JP] Japan ................................ 1-066217

[51] Int. Cl.[5] ........................ B66B 1/18; G06K 9/36; G06F 15/70

[52] U.S. Cl. .................................... 187/124; 382/18; 382/41; 340/146.2; 187/131; 187/121

[58] Field of Search .............. 187/111, 131, 124, 130, 187/121, 139, 105; 382/18, 27, 41; 364/200; 340/146; 367/93; 250/211 R, 234; 435/7.24; 356/39; 358/125

[56] References Cited

U.S. PATENT DOCUMENTS 3,448,271 6/1969 Aldrich et al. ..................... 358/125
3,936,800 2/1976 Ejiri et al. ............................ 382/27
4,023,135 5/1977 Hanmura et al. .................... 367/93
4,057,845 11/1977 Ejiri et al. .......................... 364/200
4,061,914 11/1977 Green ................................. 250/234
4,175,860 11/1979 Bacus ................................. 356/39
4,555,724 11/1985 Euriquez ............................ 187/131
4,647,531 3/1987 Kamentsky ........................ 435/7.24
4,724,313 2/1988 French et al. ................. 250/211 R
4,852,696 8/1989 Fukuda et al. ...................... 187/139
4,941,192 7/1990 Mishima et al. ...................... 382/18
5,042,620 8/1991 Yoneda et al. ...................... 187/124
5,058,185 10/1991 Morris et al. ......................... 382/41

*Primary Examiner*—Steven L. Stephan
*Assistant Examiner*—Robert Nappi
*Attorney, Agent, or Firm*—Antonelli, Terry, Stout & Kraus

[57] ABSTRACT

An elevator control system for controlling movement of cages up and down in accordance with the situation of waiting persons in landing places or passengers in the cages detected by image pickup devices and other detecting devices includes first and second image processors, the image processing level of the second image processor being not lower than that of the first image processor. The system further includes an elevator controller for controlling movement of the cages up and down, the elevator controller including a device for applying the result of image processing performed by the first image processor to the control of the cages, and a device for applying the result of image processing performed by the second image processor to the control of the cages when the image processing is carried out based on the result of image processing performed by the first image processor and other information pertaining to passengers and waiting persons detected by the other detecting devices.

26 Claims, 20 Drawing Sheets n-TH FLOOR n-TH FLOOR

ELEVATOR CONTROL SYSTEM WITH IMAGE PICKUPS IN HALL WAITING AREAS AND ELEVATOR CARS

BACKGROUND OF THE INVENTION

The present invention relates to an elevator control system for controlling movement of at least one cage up and down among a plurality of floors in an elevator path of a building and, more particularly, relates to an elevator control system for controlling the running of the cage in accordance with the situation of waiting persons in landing places or passengers in the cage obtained by means of image pickup devices so that the running efficiency can be improved and that crime prevention and monitoring can be attained.

A large number of methods for improving the running efficiency of the elevator by using image information or for improving monitoring by using image information have been proposed in patent applications. Of those methods, that disclosed in JP-A-58-69671 is as follows. That is, the degree of crowdedness in a landing, place (hereinafter called a "hall") of an observed floor is detected by using a camera and a crowdedness detector provided in the hall of the observed floor, so that in accordance with the detected degree of crowdedness, an automatic voice guidance is made in the observed floor or other floors and, at the same time, the elevator running pattern is changed.

Further, in the method disclosed in JP-A-61-192685, a camera and a detector for detecting an intruder into in a monitoring area are provided so that the camera and the monitor are actuated to operate only when an intruder exists.

The aforementioned first prior art technique has the following disadvantage. When the crowdedness detector makes a judgment that the landing place is crowded, the elevator running pattern and the voice guidance are switched to a predetermined running pattern and a predetermined voice guidance. When the judgment is not true, not only the running efficiency is lowered remarkably but unnecessary guidance is made in the floor where no person exists.

The second prior art technique has the following disadvantage. Because the detector for detecting an intruder into the monitoring area must be provided additionally and separately, not only there arises a problem in construction labor and cost but there arises another problem in that the monitor is actuated to operate wastefully even against non-intruders.

SUMMARY OF THE INVENTION

Therefore, an object of the present invention is to provide an elevator control system having an improved elevator running efficiency.

Another object of the invention is to provide an elevator control system having an improved running efficiency for group supervisory controlled elevators provided with special call buttons.

A further object of the invention is to provide an elevator control system in which cage service in accordance with the situation of waiting persons in halls and passengers in cages is carried out.

A still further object of the invention is to provide an elevator control system having improved crime prevention and monitoring.

Another object of the invention is to provide an elevator control system in which the quantity of data on a data transmission line is small and, accordingly, failure of signal transmission is reduced to thereby make exact elevator control possible.

The elevator control system according to the present invention has a feature that the system comprises image pickup means provided in at least one of a group of the inside of cages and a group of the landing places of floors of a building where the cages stop; first image processing means for processing images picked up by the image pickup means and second images processing means having an image processing level not lower than the image processing level of the first image processing means; elevator control means having means for applying the result of image processing by the first image processing means to the control of the cages, and means for applying the result of image processing by the second image processing means to the control of the cages when the image processing is carried out based on the result of image processing by the first image processing means and other information related to passengers in the cages and waiting persons in the landing places of floors.

The elevator control means may be single-elevator control means or may be group supervisory control means for general control of a plurality of elevators.

The words "image processing level" of the first and second image processing means accuracy in image processing. The first and second image processing means may be functionally united in one body or the second image processing means and the elevator control means may be functionally united in one body.

In the case where lowering of running efficiency may be caused by the running control of the respective cage based on the result of image processing by the first image processing means, the situation of the landing place or cage can be exactly recognized by using the result of image processing by the second image processing means and, at the same time, running control can be made based on the result of image processing by the second image processing means. The lowering of running efficiency can be estimated based on the result of image processing by the first image processing means and other information pertaining to passengers in cages and waiting persons in landing places of floors. Accordingly, the necessity of answering unnecessary calls can be eliminated. In addition, in the case where the number of passengers in a cage becomes two, crimes can be prevented by stopping the elevator at every floor or by stopping the elevator at the nearest floor.

DESCRIPTION OF THE PREFERRED EMBODIMENTS

An embodiment of the present invention will be described hereunder with reference to FIG. 1.

Figure 1:
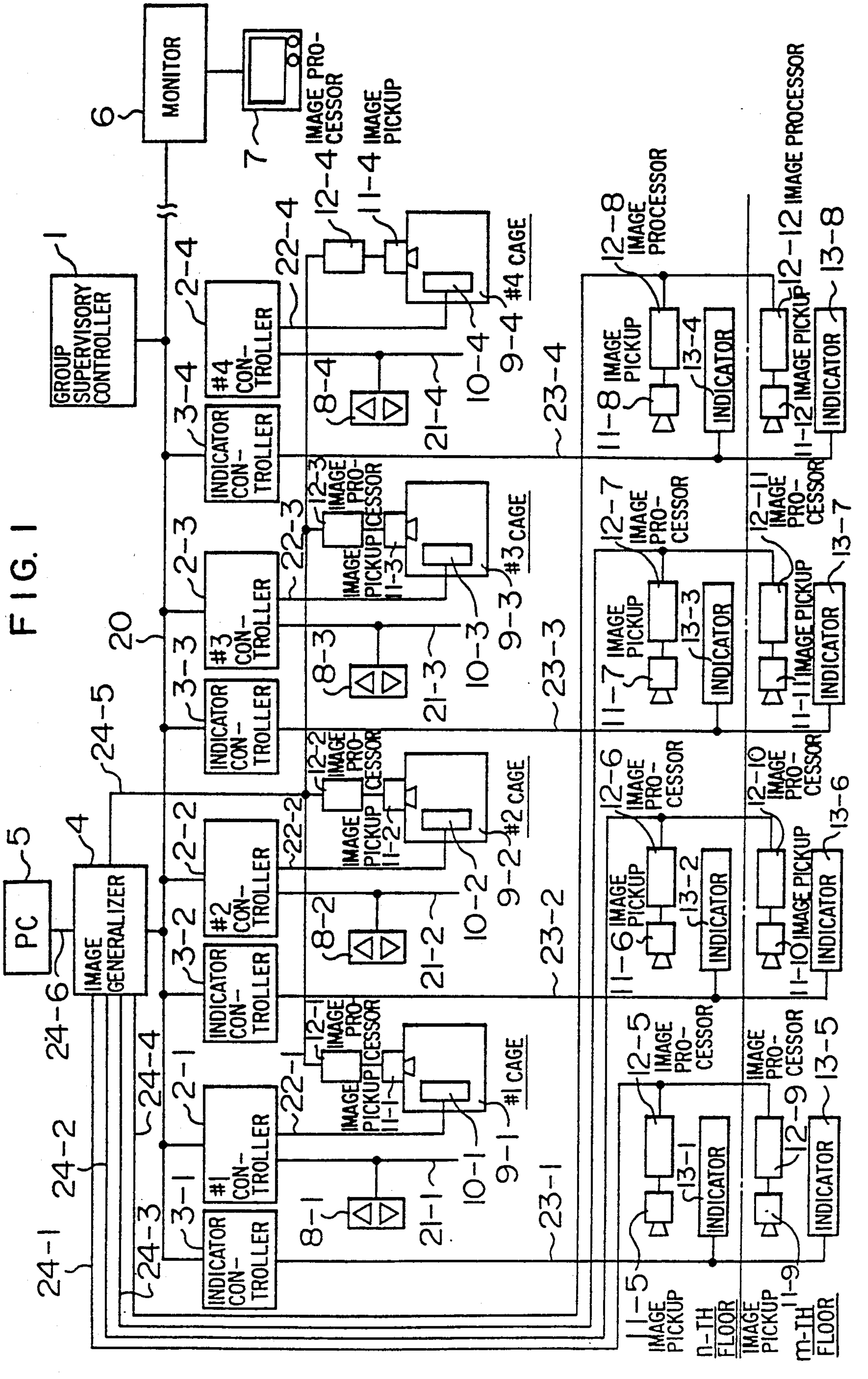
FIG. 1 is a diagram showing the whole configuration of the elevator group supervisory control system according to the present invention.

FIG. 1 shows an example of an elevator group-supervisory control system in which four elevators are generally controlled.

A group supervisory controller 1, elevator controllers 2-1 to 2-4 for controlling the four elevators respectively, indicator controllers 3-1 to 3-4, an image generalizer (second image processing means) 4 and a monitor 6 are multidropwise connected to a serial transmission line 20. Standard input-output equipment such as call buttons 8-1 to 8-4 installed in halls is connected to serial transmission lines 21-1 to 21-4 which serve as output lines of the respective elevator controllers 2-1 to 2-4. Operation panels 10-1 to 10-4 in respective cages 9-1 to 9-4 are connected to serial transmission lines 22-1 to 22-4 which serve as other output lines of the respective elevator controllers 2-1 to 2-4.

LED indicators 13-1 to 13-8 provided in the n-th and m-th floors of a building are connected, corresponding to the respective elevator controllers 2-1 to 2-4, to transmission lines 23-1 to 23-4 which serve as output lines of indicator controllers 3-1 to 3-4.

Image processors (first image processing means) 12-5 to 12-12 for processing output image signals of image pickup devices 11-5 to 11-12 installed in hall ceilings of the n-th and m-th floors and provided corresponding to the respective elevators are connected to serial transmission lines 24-1 to 24-4 which serve as output lines of the image generalizer 4, while the image processors are classified into groups corresponding to the respective elevator controllers 2-1 to 2-4. Other image processors 12-1 to 12-4 for processing output image signals of image pickup devices 11-1 to 11-4 installed in the respective cages are connected to a serial transmission line 24-5 which serves as another output line of the image generalizer 4. Further, a personal computer (hereinafter abbreviated as "PC") 5 is connected to a general communication circuit (RS-232C) 24-6.

A monitor television set (image display means) 7 for displaying image data of the image pickup devices 11-1 to 11-12 is connected to the monitor 6 connected to the transmission line 20.

In the following, the configuration and operation of an image processing subsidiary system in the elevator group supervisory system are described with reference to FIG. 2.

The configuration and operation of the image processors 12-1 to 12-2 are described in detail with reference to the image processor 12-5.

The image processor 12-5 comprises an image input portion 12-5-1, an image processing portion 12-52-2, and transmission processing portion 12-5-3. The image input portion 12-5-1 serves to convert the output image signal (analog quantity) of the image pickup device 11-5 into a digital quantity. The image processing portion 12-5-2 serves to detect the situation of waiting persons remaining in the hall, judging from the digital quantity, as will be described more in detail. The transmission processing portion 12-5-3 serves to transmit the information of waiting persons found as described above to the image generalizer 4 according to a predetermined format.

Figure 3:
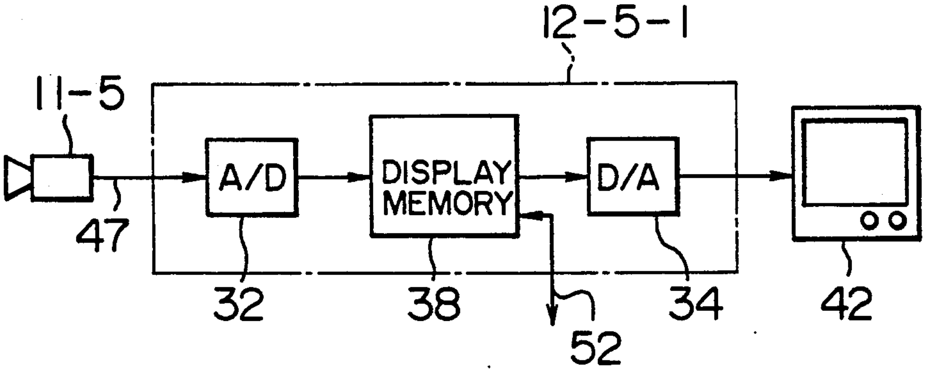
FIG. 3 is a diagram showing the detailed configuration of the image input portion depicted in FIG. 2.
Figure 4:
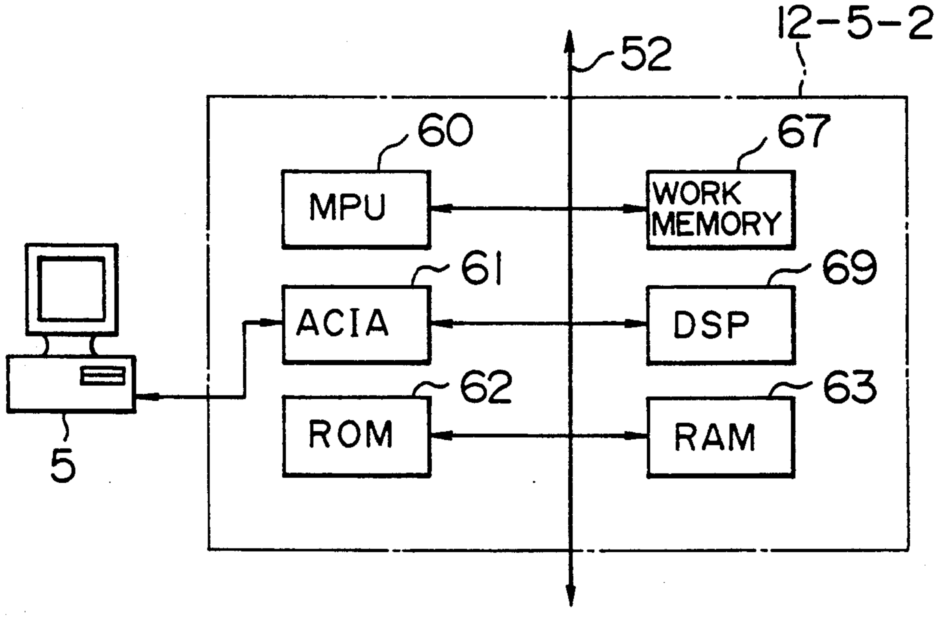
FIG. 4 is a diagram showing the detailed configuration of the image processing portion depicted in FIG. 2.
Figure 5:
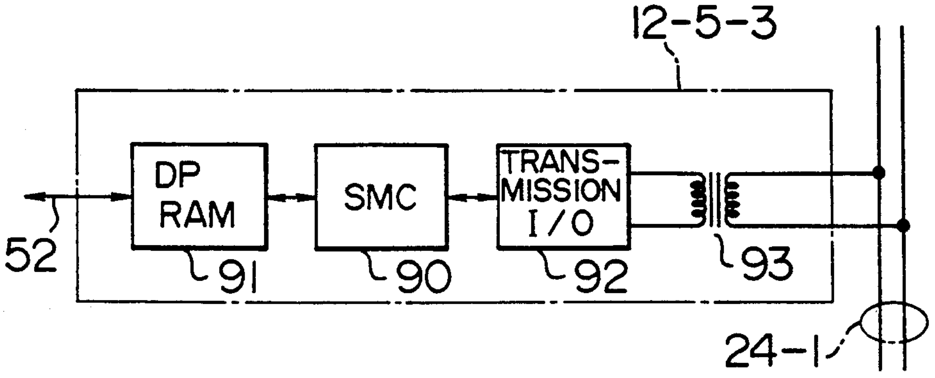
FIG. 5 is a diagram showing the detailed configuration of the transmission processing portion depicted in FIG. 2.

The configurations of the image input portion 12-5-1, the image processing portion 12-5-2 and the transmission processing portion 12-5-3 are shown in FIGS. 3, 4 and 5, respectively.

As shown in FIG. 3, the image input portion 12-5-1 has an A/D converter circuit 32 for converting an analog image signal 47 into a digital signal, a display memory 38 for temporally storing an original image in the form of a digital signal, and a D/A converter circuit 34 through which a monitor television set 42 can be connected for the purpose of adjusting the image processor individually.

In FIGS. 3 and 4, reference numeral 52 designates a data bus through which the digital signal of the original image is transmitted between the image processing portion 12-5-2 depicted in FIG. 4 and the transmission processing portion 12-5-3 depicted in FIG. 5.

As shown in FIG. 4, the image processing portion 12-5-2 serves as a center portion of the image processor 12-5. The image processing portion 12-5-2 has a work memory 67 for storing background and original images, a digital signal processor (DSP) 69 for performing image processing, a micro-processing unit (MPU) 60 for performing original image storage and original image processing, a read-only memory (ROM) 62 for storing a processing program in advance, and a random-access memory (RAM) for temporally storing data processed by the MPU 60. The MPU 60 serves to find the number of waiting persons and perform image recognition, such as for example a judgment as to whether a wheelchair is used or not. The image processing portion 12-5-2 is connected to the PC 5 through an asynchronous communication IC (ACIA) 61.

As shown in FIG. 5, the transmission processing portion 12-5-3 has a single-chip microcomputer (SMC) 90, a dual-port RAM (DPRAM) 91, a transmission interface circuit 92, and a pulse transformer 93.

In the following, a practical method for detecting waiting persons in an elevator hall using the apparatus configured as described above is described.

Figure 6:
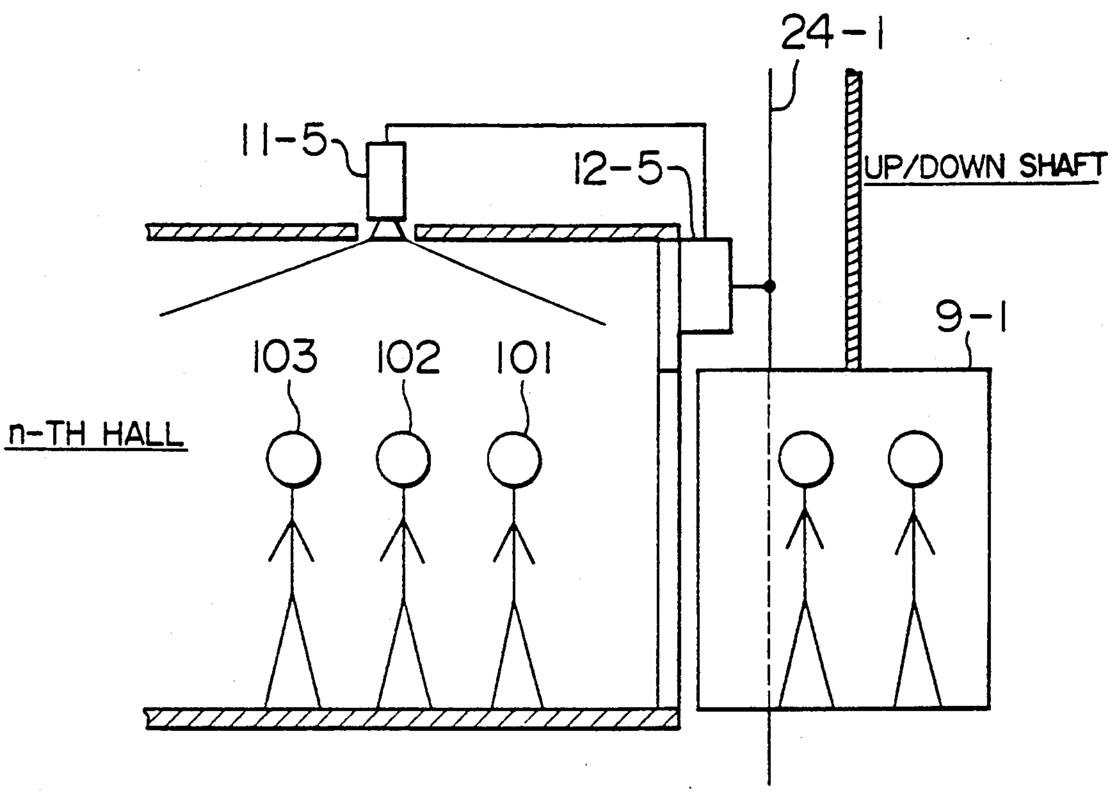
FIG. 6 is a diagram showing the situation in which an image pickup device and an image processor are set in each hall.

FIG. 6 shows the situation in which the apparatus is set.

The image pickup device 11-5 is installed in the ceiling of the elevator hall of the n-th floor. The image processor 12-5 is installed in an elevator shaft where the cage 9-1 moves. The image processor 12-5 is connected through a picture signal cable. The output of the image processor 12-5 is connected to a transmission line 24-1 laid in the elevator path, so that information is transmitted to the image generalizer 4 through the transmission line 24-1.

A method for detecting waiting persons 101 to 103 in the hall in the aforementioned setting situation will be described hereunder.

Figure 7:
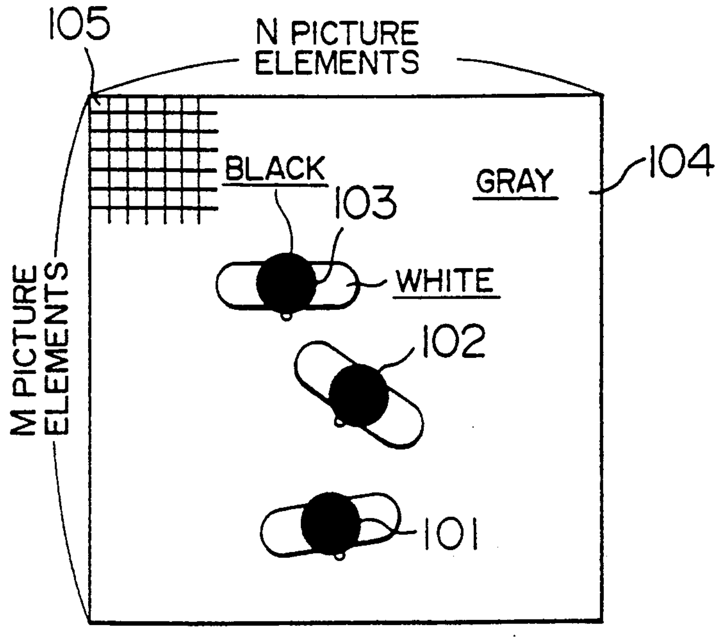
FIG. 7 is a diagram showing an example of an image of passengers in a cage picked up by an image pickup device.

FIG. 7 shows an example of a picture picked up by the image pickup device 11-5. In FIG. 7, one scene 104 is formed by a number, N, of unit picture elements 105 arranged in the horizontal direction and a number, M, of unit picture elements 105 arranged in the vertical direction. The numbers N and M vary according to the image pickup device. In this embodiment, the resolution power in the image input portion 12-5-1 of the image processor 12-5 is assumed to be 256×240. In short, the numbers N and M are assumed to be 256 and 240, respectively. In the drawing, background, head and clothing colors are assumed to be gray, black and white, respectively.

Figure 8:
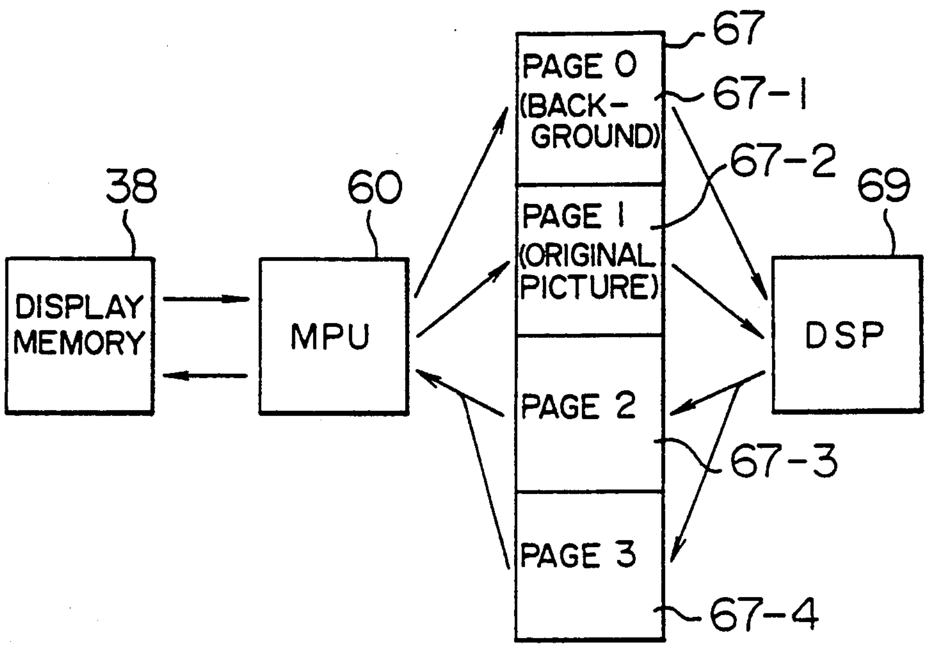
FIGS. 8 through 10 are diagrams for explaining an image processing method used in the image processor.

As shown at a FIG. 8, in suitable timing, the MPU 60 judges that there is no waiting person on the basis of the image input to the display memory 38 and the running state of the elevator. The image as a background image is stored in the page 0, 67-1, of the work memory 67. Then, a next image, as an original image, is input after the passage of a predetermined time and stored in the page 1, 67-2, of the work memory 67. Then, the MPU 60 makes the DSP 69 carry out image processing according to the aforementioned procedure, so that images thus obtained are stored in the pages 2 and 3, 67-3 and 67-4, of the work memory 67, successively and periodically.

The images stored in the respective pages 67-2 to 67-4 of the work memory 67 are overwritten periodically and successively to be updated with newer images.

Figure 9:
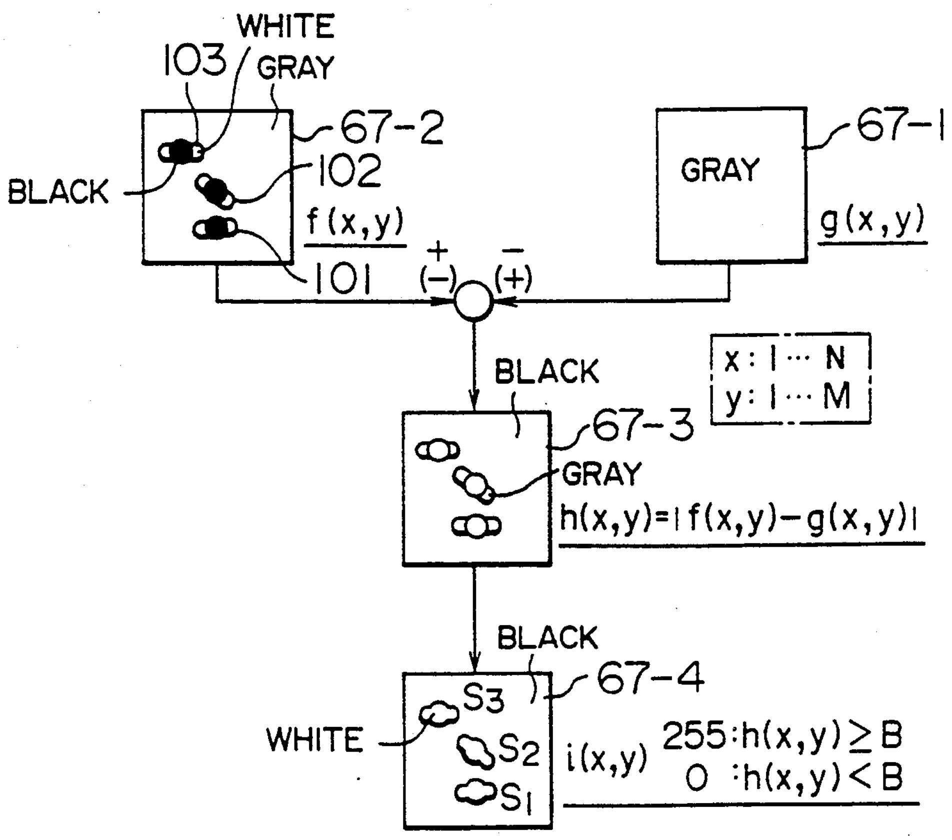

FIG. 9 shows the content of the processing in the DSP 69. When the background image stored in the page 0, 67-1, and the original image stored in the page 1, 67-2, are expressed respectively by g(x, y) and f(x, y), the DSP 69 calculates the absolute value h(x, y) of the difference therebetween by the following formula and stores the value in the page 2, 67-3, of the work memory 67.

$$h(x, y) = |f(x, y) - g(x, y)|$$

As a result, background and body colors become black and gray, respectively. Then, the image is compared with a suitable threshold B and transformed to a binary image i(x, y) represented by the following formula. The binary image is stored in the page 3, 67-4 of the work memory 67. As a result, background and body colors become black and white, respectively.

$$i(x,y) = \begin{cases} 255: h(x,y) \geqq B \ldots \text{white} \\ 0: h(x,y) < B \ldots \text{black} \end{cases}$$

In the formula, x represents an integer in a range of from 0 to N (255), and y represents an integer in a range of from 0 to M (239).

Figure 10:
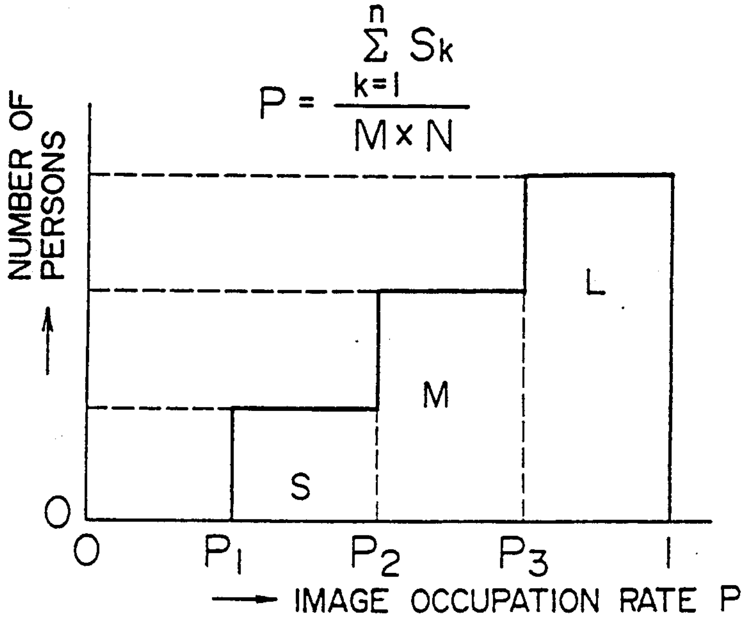

The MPU 60 classifies the situation of waiting persons into 4 groups as shown in FIG. 10 based on the result. In short, the MPU 60 calculates an area (number of picture elements) occupied by the body color based on the binary image stored in the page 3, 67-4, of the work memory 67 and an occupied area rate P by dividing the area by the number of total picture elements, as shown in the following expression.

$$P = \frac{\sum_{K=1}^{n} S_K}{N \times M}$$

Assuming now that the areas corresponding to the waiting persons 101, 102 and 103 are replaced by $S_1$, $S_2$and $S_3$, respectively, then n in the expression takes the value of 3.

The occupied area rate P is within a range represented by the relation $0 \leqq P \leqq 1$. In this embodiment, the range is classified into four groups, namely, a group from 0 to $P_1$, a group from $P_1$ to $P_2$, a group from $P_2$ to $P_3$, and a group from $P_3$ to 1. In short, the MPU 60 roughly recognizes the situation of waiting persons classified into four groups, namely, 0 "no waiting person", S "a small number of waiting persons", M "a medium number of waiting persons", and L "a large number of waiting persons", The detection accuracy is about ±30% relative to the number of persons. Accordingly, processing speed can be improved sufficiently to perfect the processing in the time required by the group supervisory controller 1.

The situation of waiting persons is detected in each of the cages 9-1 to 9-4 in the same manner as described above.

In the following, the configuration and operation of the image generalizer for generalizing information obtained in the image processors 12-1 to 12—12 as described above is described with reference to FIG. 2.

Figure 2:
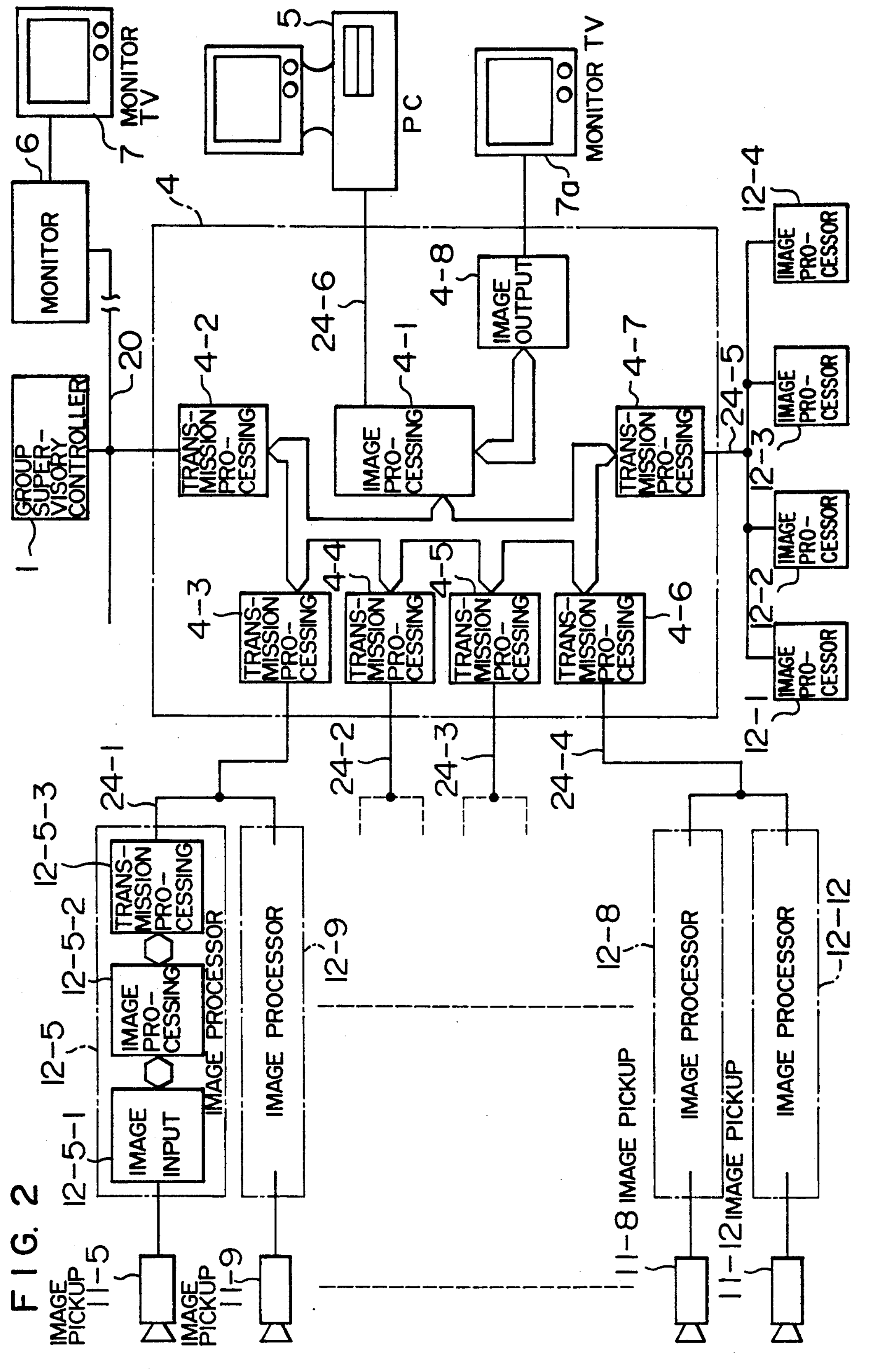
FIG. 2 is a diagram showing an image processing subsidiary system in the elevator group supervisory control system depicted in FIG. 1.

As shown in FIG. 2, the image generalizer 4 comprises an image processing portion 4-1, a plurality of transmission processing portions 4-2 to 4-7, and an image output portion 4-8. The configuration of the portions 4-1 to 4-7 is the same as that of the portions of the image processor 12-5. Accordingly, the original image transmitted to the image generalizer 4 is processed in the image processing portion 4-1 so that the number of waiting persons or the existence of a wheelchair user can be judged from image recognition. The image processing accuracy in the image generalizer 4 is not less than that of the image processors 12-1 to 12-12. In the case where accurate image processing is required, the detection accuracy can be improved to about ±5% relative to the number of persons. configuration of the portions is the same as in FIGS. 3 to 5. Detailed description of the configuration of the portions will be omitted. The configuration of the image output portion 4-8 is the same as that of the image input portion 12-5-1 of the image processor 12-5, except that the image output portion 4-8 does not use the image input function.

In the following, the operation of the elevator control system according to the present invention is described.

The elevator control system has two operation modes. The first mode is related to elevator control, and the second mode is related to adjustment and checking of the image processor provided separately from the image generalizer.

In the following, the first mode is described with reference to FIG. 11.

Figure 11:
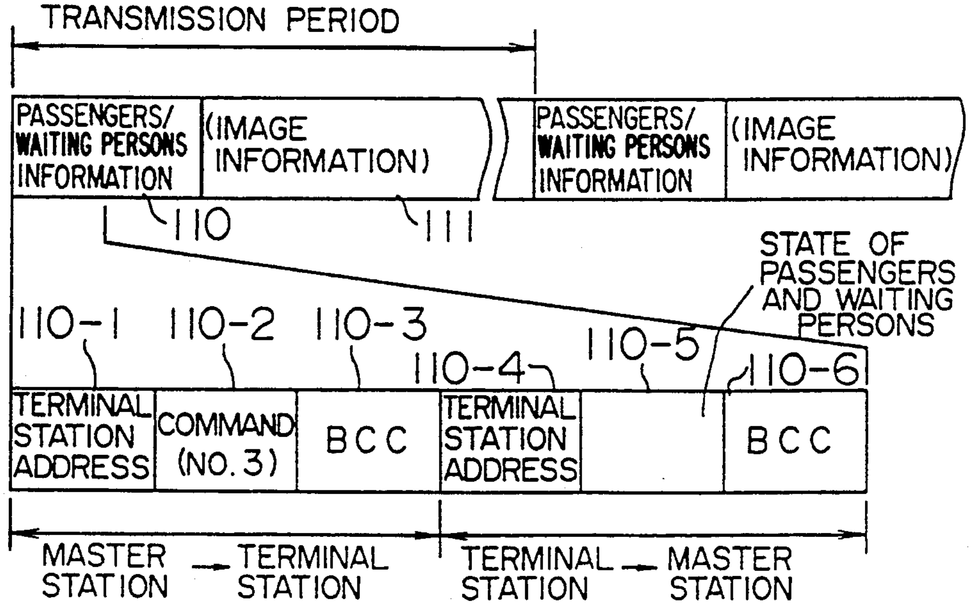
FIG. 11 is a diagram showing a format in data transmission between the image generalizer and the respective image processor.

As shown in FIG. 11, the transmission processing portions 4-3 to 4-7 of the image generalizer 4 serve as master stations which periodically collect information pertaining to waiting persons or passengers (information pertaining to waiting persons is information pertaining to the situation of waiting persons in halls, and information pertaining to passengers is information pertaining to passengers in cages) from the image processors 12-1 to 12—12 serving as terminal stations. In short, one transmission period is separated into a period 110 for transmitting information pertaining to waiting persons and passengers and a room period (in which image information is transmitted if necessary) 111. The period 110 for transmitting information pertaining to waiting persons and passengers is further separated into a period in which a command 110-2 and a block check code 110-3 are transmitted from the image generalizer 4 as a master station to an image processor as a terminal station designated by a terminal station address 110-1 and a period in which waiting person or passenger information (hereinafter called "processed data") 110-5 and a block check code 110-6 are received in the master station from the designated image processor corresponding to the terminal station address 110-4 and the command. The transmission period is repeated by the number of terminal stations connected to the transmission lines so that processed data are collected.

The contents of the command in conjunction with an example of processing in the respective terminal station are shown in Table 1.

TABLE 1

| Command No. | Contents | Procedure in Terminal Station: Contents | Procedure in Terminal Station: Transmission |
|---|---|---|---|
| 1 | Input of background image | Background image is input to judge whether a person exists or not. | Absent |
| 2 | Input of original image | Original image is input to find the situation of waiting persons and passengers. | Absent |
| 3 | Processed data request | The situation of waiting persons and passengers is transmitted. | Present |
| 4 | Image data request | Image data in designated page is transmitted. | Present |
| 5 | Tuning | Predetermined tuning is carried out. | Absent |

In general, the image generalizer 4 carries out processing designated by command No. 3 in Table 1, so that collected processed data are stored in the DPRAMs of the transmission processing portions 4-3 to 4—7, respectively. The MPU of the image processing portion 4-1 serves to store the data in the DPRAM of the transmission processing portion 4-2 after arrangement of the data. As a result, the data processed by the image processors 12-1 to 12—12 are successively stored in storage areas 120 to 131 as shown in a memory map of FIG. 12.

Figure 13:
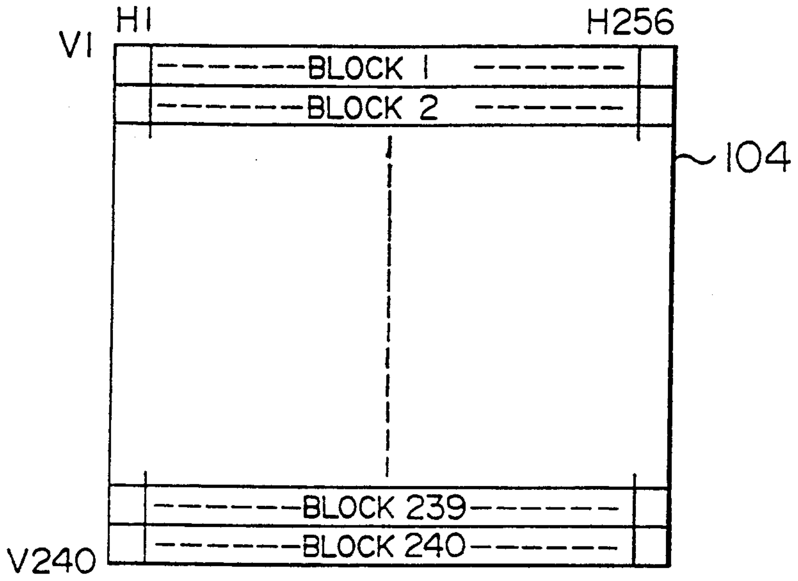
FIG. 13 is a diagram for explaining a method for transmission of image information data into a storage area in the memory map depicted in FIG. 12.
Figure 14:
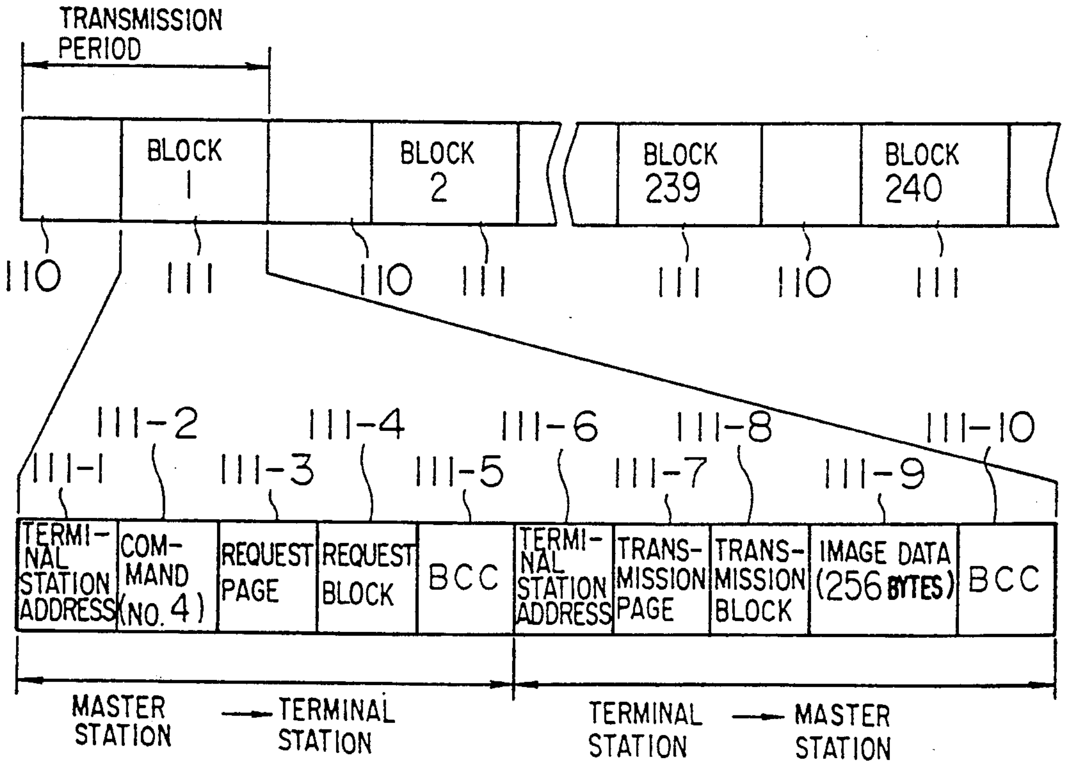
FIG. 14 is a diagram showing a format in transmission of image information data into a storage area in the memory map depicted in FIG. 12.

The storage area 132 serves as a work area in the case where the image data (image information) obtained in the room period 111 depicted in FIG. 11 is transmitted. As shown in FIG. 13, the image data is transmitted according to the transmission format depicted in FIG. 14 after one scene 104 is divided into 240 (M) blocks each of which has 256 bytes (N). In short, the image data is transmitted as follows. An address 111-1 of a terminal station requesting the image data, a command 111-2 for requesting the image data, a page number 111-3 requested, a block number 111-4 requested, and a block check code 111-5 are transmitted from the master station to the terminal station. Then, an address 111-6 of the terminal station serving as an answer, a transmission page number 111-7, a transmission block number 111-8, one-block image data 111-9 (256 bytes), and a block check code 111-10 are transmitted from the terminal station to the master station. The aforementioned transmission procedure is repeated until transmission of all blocks (240 blocks) is completed.

The group supervisory controller 1 receives the processed data through the transmission processing portion 4-2 and the transmission line 20 and performs running pattern control such as assignment of the number of elevators in accordance with the situation of waiting persons. If necessary, the group supervisory controller 1 issues an image request instruction to the image generalizer 4 based on the result of image processing by each image processor and other information pertaining to passengers, for example, in the case where information of the presence of waiting persons is given with no occurrence of pushing of hall call buttons 8-1 to 8-4 or in the case where one of special call buttons is pushed. The image generalizer 4 carries out the procedure designated by command No. 4 in Table 1 corresponding to the instruction, to thereby obtain the image data from the designated image processor. Then, the image processor 4 carries out detailed processing and then transmits the result of the detailed processing.

The group supervisory controller 1 issues a monitoring instruction based on the data transmitted from the image generalizer 4, so that the monitor 6 displays a designated image on the television set 7 in response to the monitoring instruction.

This series of procedure is described with reference to the flow charts of FIGS. 15 to 17 which show an example of crime prevention elevator running control.

Figure 15:
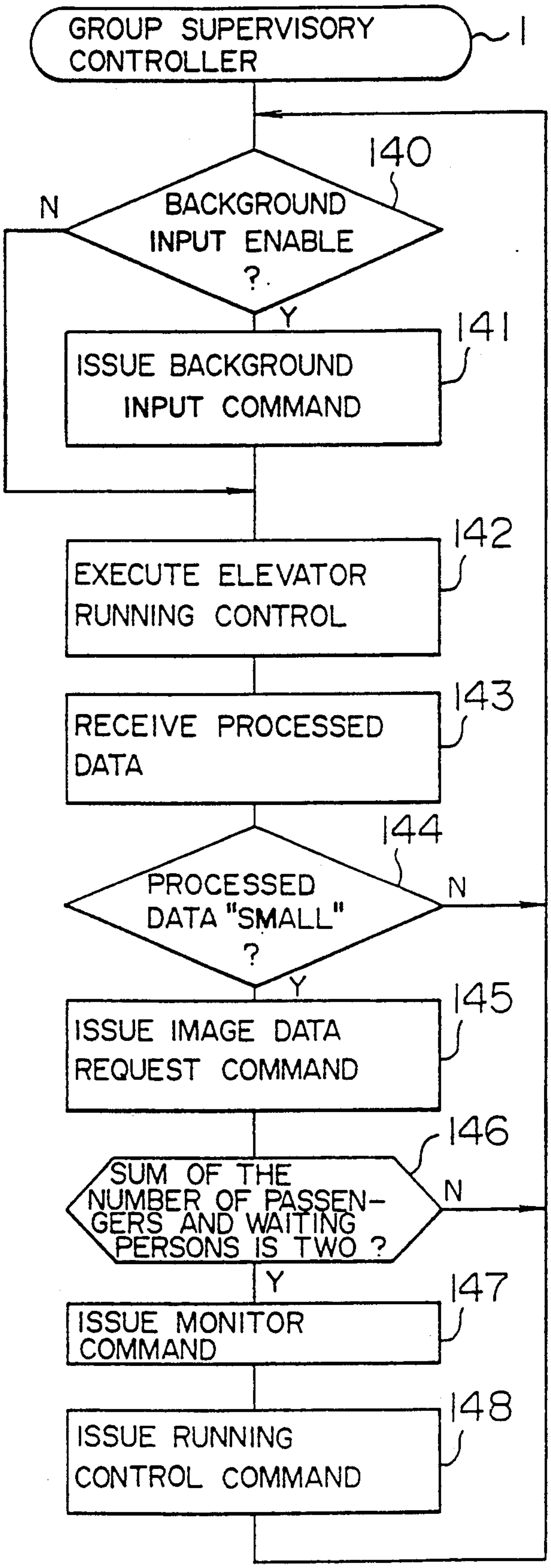
FIG. 15 is a flow chart showing the operation of the group supervisory controller depicted in FIG. 1.

When a judgment in Step 140 in FIG. 15 proves that there is no person or a few persons on the basis of circumstances, such as running situations of the respective elevators, hall call button information, cage call button information and measurements performed by the respective intra-cage load weight detector, (that is, other information pertaining to passengers), the group supervisory controller 1 issues both a background input instruction and a terminal station address of a input enabled image processor to the image generalizer 4 in Step 141. When there is no take-in-enabled image processor in Step 140, the Step 141 is bypassed. In Step 142, ordinary elevator running control is carried out. In Step 143, processed data of all the image processors 12-1 to 12—12 collected in the image generalizer 4 are received. When a judgment in Step 144 proves that at least one data of "small" exists in the processed data, an image data request command and a terminal station address of the image processor generating the data "small" are issued to the image generalizer 4 in Step 145.

The Step 145 corresponds to the means for finding the result of image processing by the second image processing means based on the result of image processing by the first image processing means and other information pertaining to passengers.

Assuming now that the image processor generating the data "S" is an image processor 12-5 for processing an image in the vicinity of the No. 1 elevator in the hall of the n-th floor, then the image generalizer 4 receives a background image data and an original image data of the image processor 12-5 and another image processor 12-1 provided to process the output image signal of the image pickup device 11-1 installed in the No. 1 elevator and calculates the number of persons by detailed processing. The result of the processing is used for cage control. In short, in the case where the result of the processing shows that the sum of the number of passengers and the number of waiting persons is two, the group supervisory controller 1 judges from Step 146 that monitoring is required for prevention of crimes and the group supervisory controller 1 issues a monitoring instruction to the image generalizer 4 and the monitor 6 in Step 147. As a result, the monitor 6 starts its operation. When one or two waiting persons get on the elevator so that the number of passengers in the elevator changes to two, a running pattern control instruction to stop the elevator at every floor is issued in Step 148. Thereafter, the situation of the procedure is returned so that the series of the procedure is repeated. When the number of passengers is not two, the running pattern is returned to the original pattern. As described above, a novel point of the present invention is in that the group supervisory controller 1 re-confirms the situation of waiting persons and passengers and uses the result of the reconfirmation for cage control.

Figure 16:
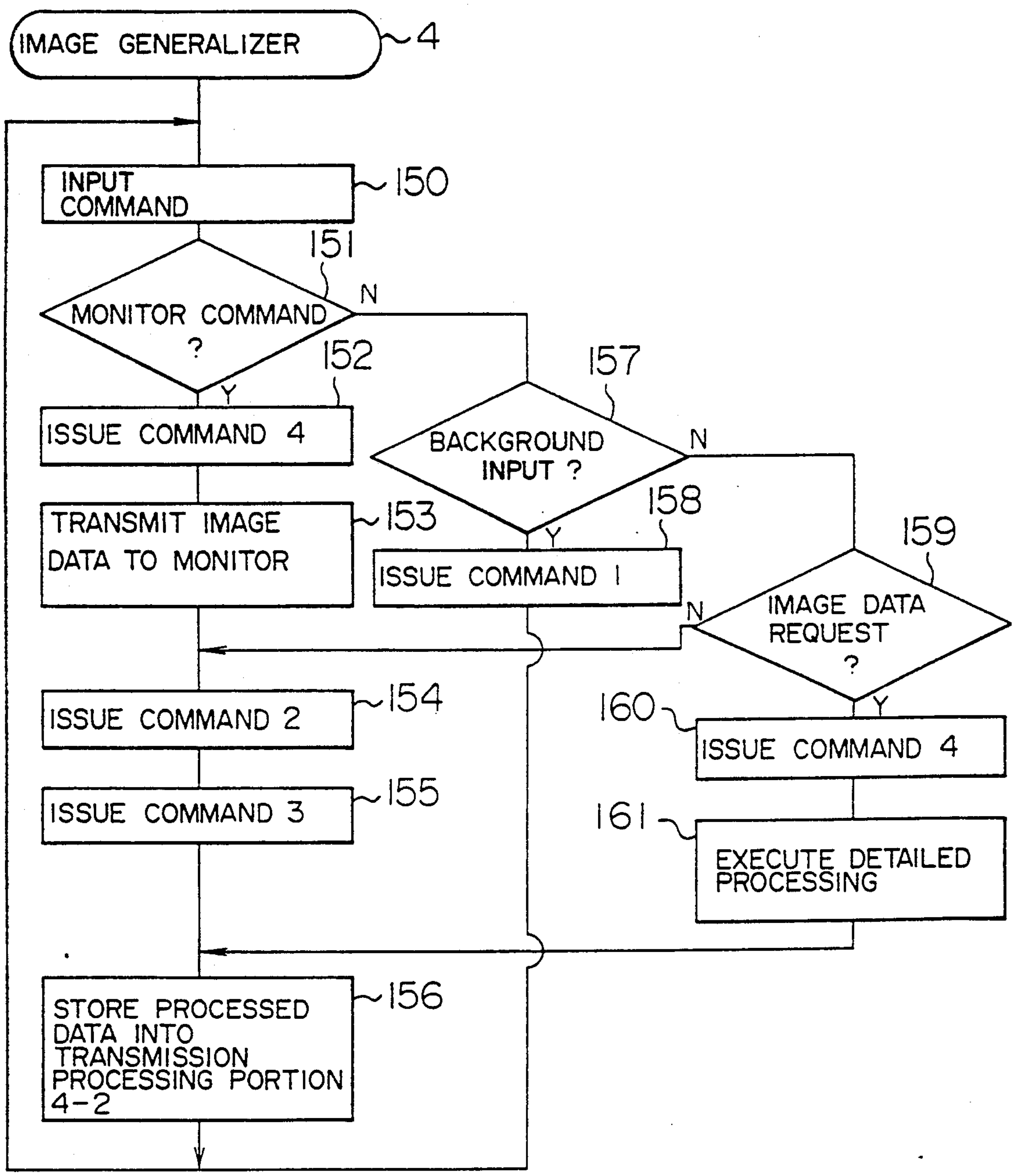
FIG. 16 is a flow chart showing the operation of the image generalizer depicted in FIG. 1.

Then, the image generalizer 4 receives an instruction from the group supervisory controller 1 in Step 150 in FIG. 16 and judges in Step 151 whether the instruction is a monitoring instruction or not. When the instruction is a monitoring instruction, command No. 4, that is, an image data request command is issued to an image processor designated by the group supervisory controller 1 in Step 152. The image data received is transmitted to the monitor 6 in Step 153, so that the image is displayed on the monitor television set 7. Then, command No. 2, that is, an image input command is issued to all the image processors 12-1 to 12—12 to carry out processing for the next original image. The results are collected and arranged in Step 155. The result of Step 155 is stored in Step 156 in the transmission processing portion 4-2 which carries out transmission processing with respect to the group supervisory controller 1. Thereafter, the situation of the procedure is returned to the head step of the series of the procedure.

Figure 12:
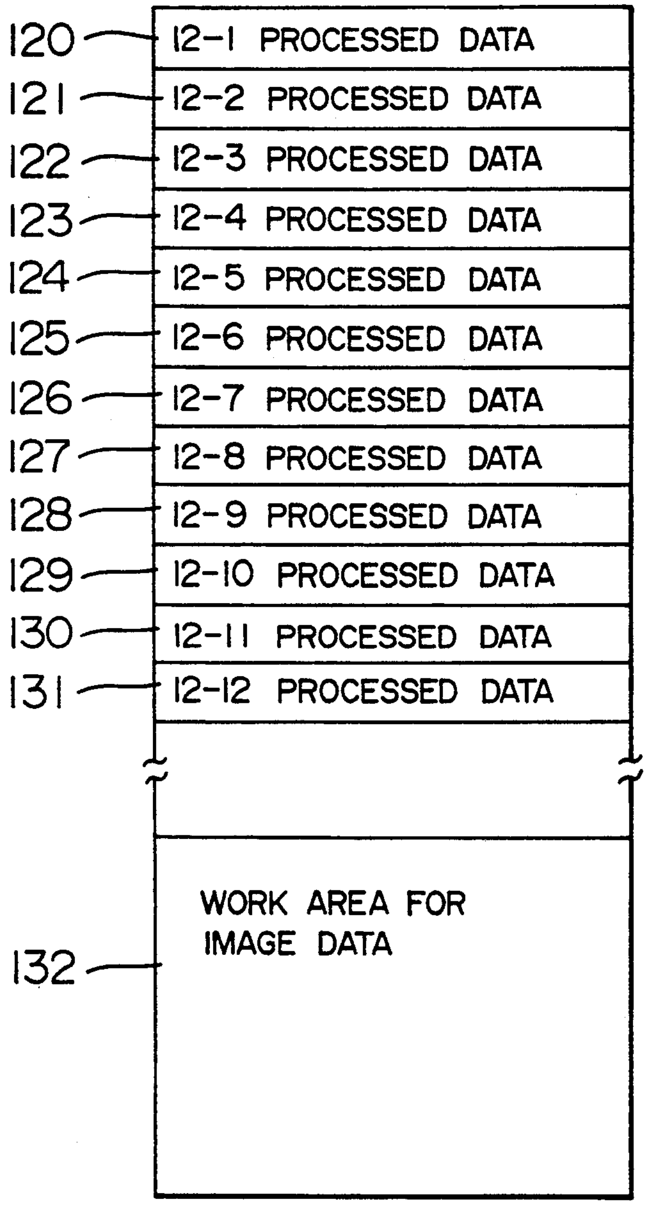
FIG. 12 is a diagram showing a memory map in the DPRAM of the transmission processing portion in the image generalizer.

On the other hand, when the judgment in Step 151 proves that the instruction is not a monitoring instruction, a judgment in Step 157 is made as to whether the instruction is a background image input instruction or not. When the instruction is a background image input instruction, command No. 1, that is, a background image input command is issued to the image processor designated by the group supervisory controller 1 in Step 158. Then, the situation of the procedure is returned to the head step. When the judgment in Step 157 proves that the instruction is not a background image input instruction, a judgment in Step 159 is made as to whether the instruction is an image data request instruction or not. When the judgment proves that the instruction is an image data request instruction, command No. 4 is issued to the image processor designated by the group supervisory controller in Step 161 so that both a background image and an original image are received. These images are processed in detail in Step 161. In Step 156, the results are stored in suitable positions in the processed data storage areas 120 to 131 of the DPRAM in the transmission processing portion 4-2 as shown in FIG. 12.

The original image transmitted to the image generalizer 4 based on the image data request instruction may be an original image stored in the display memory 38 of the respective image processors as a base of the instruction or may be a newest original image input just before the instruction.

Finally, the processing by the image processors 12-1 to 12—12 is described.

Figure 17:
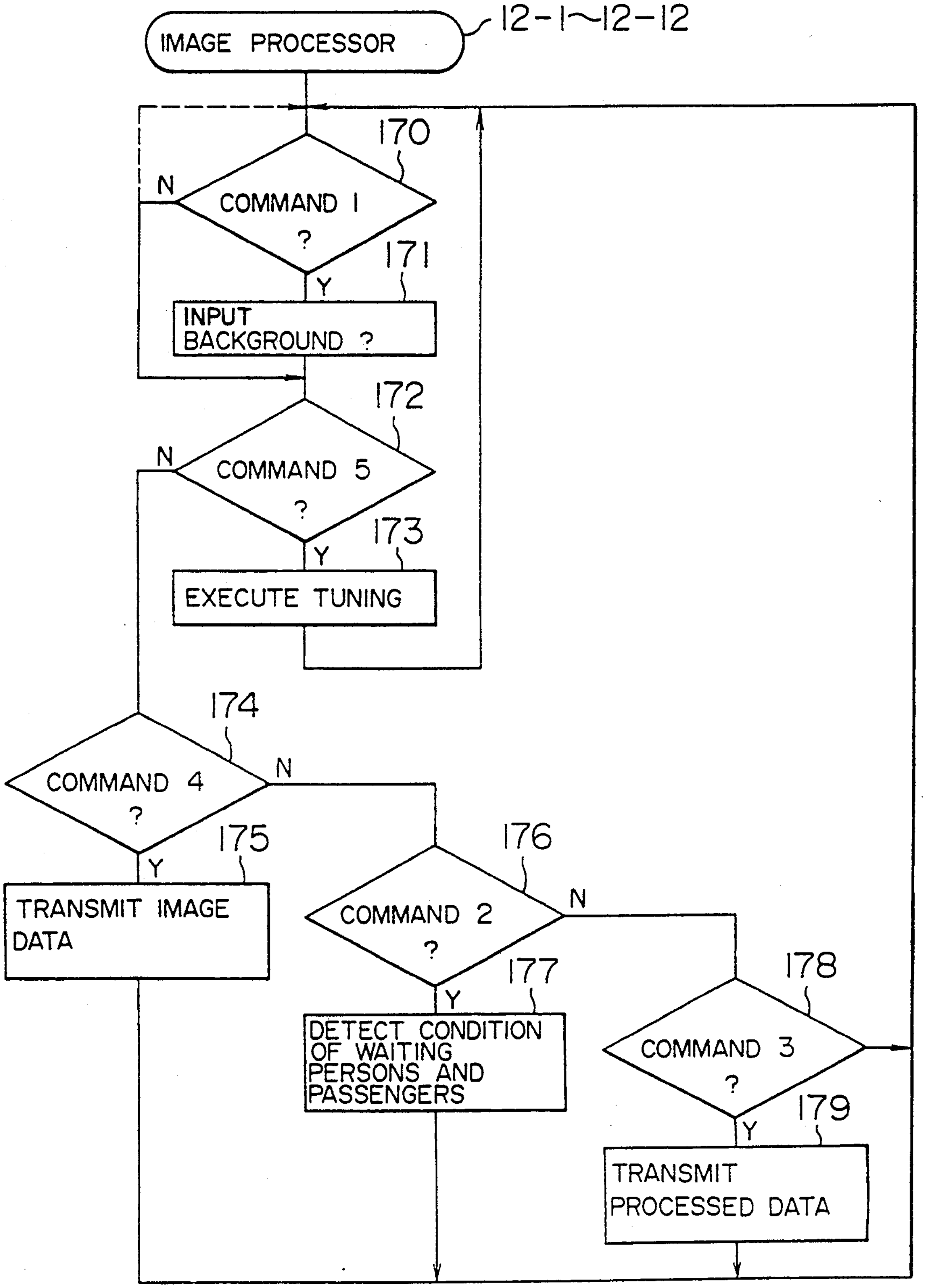
FIG. 17 is a flow chart showing the operation of each image processor.

The command from the image generalizer 4 is first judged in Step 170 in FIG. 17. When the command is command No. 1, background image take-in processing is carried out in Step 171. When the command is not command No. 1, the Step 171 is bypassed. In the case where the Step 171 has not been executed, the situation of the procedure is returned to the head step as shown by the broken line. Then, a judgment in Step 172 is made as to whether the command is command No. 5 or not. When the command is command No. 5, a designated tuning procedure is carried out in Step 173. Thereafter, the situation of the procedure is returned to the head step. When the command is not command No. 5, a judgment in Step 174 is made as to whether the command is command No. 4 or not. When the command is command No. 4, an image data in a designated page is transmitted to the image generalizer 4 in Step 175 and then the situation of the procedure is returned to the head step. When the command is not command No. 4, a judgment in Step 176 is made as to whether the command is command No. 2 or not. When the command is command No. 2, the procedure of detecting the situation of waiting persons and passengers is carried out in Step 177 and then the situation of the procedure is returned to the head step. When the command is not command No. 2, a judgment in Step 178 is made as to whether the command is command No. 3 or not. When the command is command No. 3, the processed data is transmitted to the image generalizer 4 in Step 179 and then the situation of the procedure is returned to the head step. When the command is not command No. 3, the situation of the procedure is returned to the head step without executing any procedure.

According to the aforementioned example of the first mode, the group supervisory controller 1 issues a monitoring instruction or a crime-prevention running control instruction to stop the elevator at every floor based on the accurate image re-recognition of the image generalizer 4 through the step of transmitting stored original images from the image processors 12-1 to 12—12 to the image generalizer 4. Accordingly, criminal acts can be prevented so that the system can be improved in crime prevention and, consequently, secure running service to passengers can be carried out.

Even in the case where information that waiting persons exist is given with no pushing of hall call buttons 8-1 to 8-4, exact processing can be carried out by the image generalizer 4. In short, the initial input information that waiting persons exist can be neglected when an exact decision is made by the image generalizer 4 that there are no waiting persons. Accordingly, wasteful time caused by the stopping of the elevator at unnecessary floors can be eliminated to thereby attain improvement in running efficiency.

The image re-recognition may be carried out regardless of the judgment of the group supervisory controller and through the step of obtaining original data from the image processors 12-1 to 12—12 at the point of time when the image generalizer 4 detects the fact that there is a small number of waiting persons or passengers.

According to the aforementioned method, a burden imposed on software processing in the group supervisory controller 1 can be lightened.

In the elevator group supervisory control system as shown in FIG. 1, an image information subsidiary system as shown in FIG. 2 and an indication subsidiary system comprising indicator controllers 3-1 to 3-4 and LED indicators 13-1 to 13-8 are provided in parallel to each other. The group supervisory controller 1 performs control to timely feed information to the LED indicators 13-1 to 13-8 based on exact information obtained from the image information subsidiary system.

Figure 18:
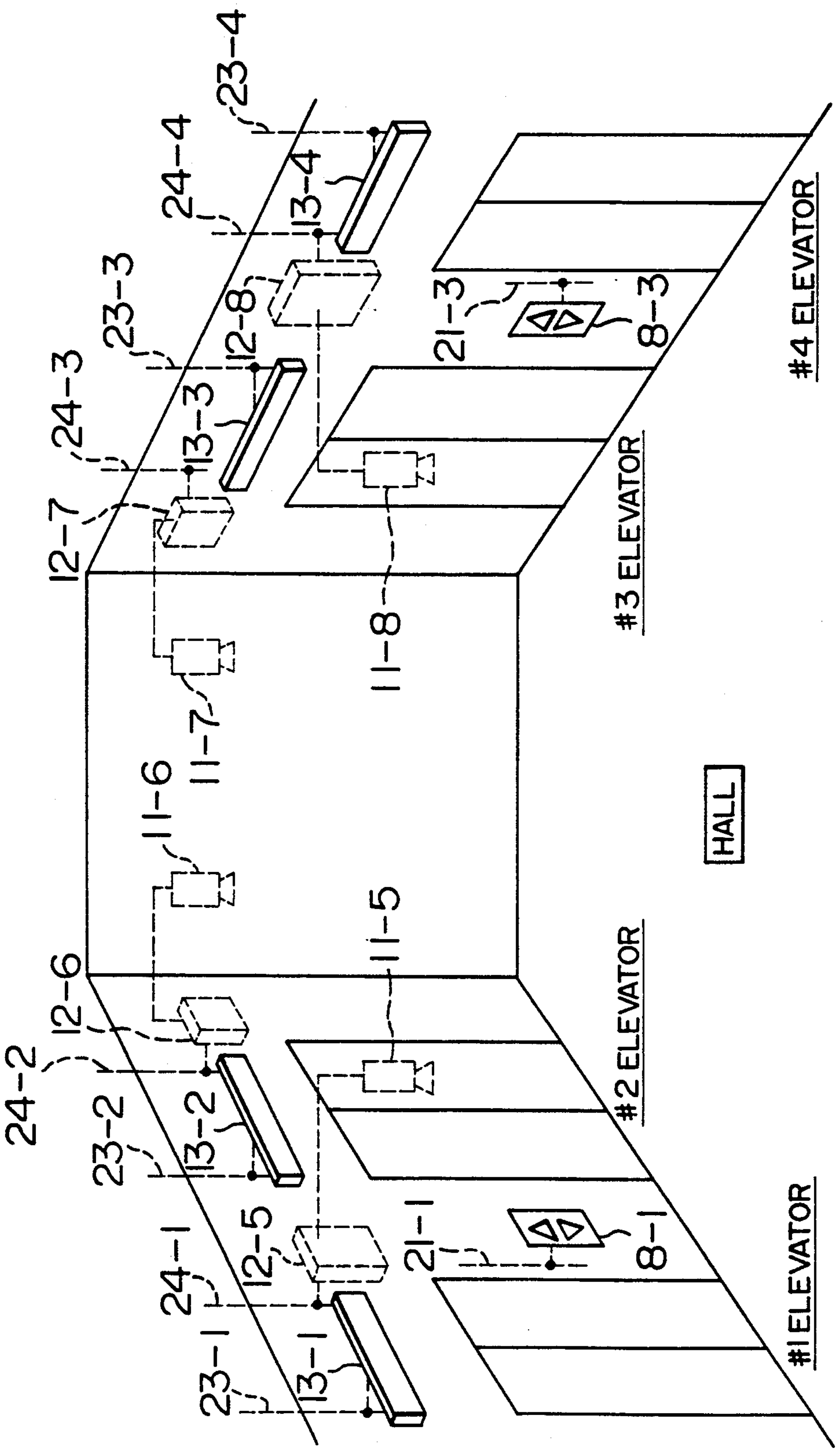
FIG. 18 is a diagram showing an example of the condition in which image pickup devices and LED indicators are set in an n-th floor.

FIG. 18 shows an example of the locations of the LED indicators 13-1 to 13-4 at the n-th floor. Table 2 shows an example of the relationship between the output timing of information and the indication pattern of indication contents.

TABLE 2

| Timing | Place | Display Contents |
|---|---|---|
| Upon detection of person | Corresponding indicator | "Welcome." "Push call button, please." |
| Upon assignment of elevator | All indicators | "Wait in front of No. ◯ elevator." "Wait for ◯ seconds." |
| Crowded at m-th floor | Indicator in front of elevator with waiting person | "Crowded at m-th floor. Wait for a bit, please." "Crowded at m-th floor. Use an escalator (moving staircase)." |
| Upon change of elevator allocation | ditto | "Assignment is changed to No. ◯ elevator." "Move in front of No. ◯ elevator." |
| Arrival of elevator | Indicator in front of arriving elevator | "There are persons getting off. Clear the way." |

In short, as shown in FIG. 18, the image pickup devices 1-5 to 11-8 are provided in suitable locations of the hall ceiling where images in the vicinity of the entrances of the elevators can be picked up. The output lines of the image pickup devices are connected to the image processors 12-5 to 12-8 installed in the elevator shafts. The output lines of the image processors 12-5 to 12-8 are connected to the image generalizer 4 installed in a machine chamber through serial transmission lines 24-1 to 24-4 installed in the elevator shafts. On the other hand, the LED indicators 13-1 to 13-4 are provided in places which can be seen easily and located in the vicinity of the entrances of the elevators as shown in the drawing. Information to be indicated is transmitted from the indicator controllers 3-1 to 3-4 to the LED indicators through the transmission lines 23-1 to 23-4 installed in the elevator shafts. Information obtained by hall buttons 8-1 to 8-3 provided in the hall is transmitted to the respective elevator controllers 2-1 and 2-3 through the transmission lines 21-1 and 21-3 installed in the elevator shafts.

The group supervisory controller 1 makes the LED indicators 13-1 to 13-4 perform indication of necessary information at various kinds of timings as shown in Table 2. By using image information in combination, the LED indicators can be used efficiently and, accordingly, improvement in service for users can be attained.

To lighten the burden on software processing in the group supervisory controller 1, the function thereof may be separated so that the indicator controllers 3-1 to 3-4 can carry out indication information as shown in Table 2 through input of information pertaining to the running of the elevator cages 9-1 to 9-4 and information pertaining to the situation of waiting persons.

There may be provided a time zone in which pictorial patterns from the indicators 13-1 to 13-8 are displayed in the form of animation, in the case where the fact that at least one child is present among the waiting persons is estimated based on characteristics such as size, length, width, and the like of the person seen from the ceiling. By using the aforementioned method, the child can have an interest in the indicators to thereby prevent the child from making a noise in the hall, thereby attaining maintenance of order among waiting persons in the hall.

Though not shown in Table 2, the group supervisory controller 1 may assign a current service cage and another additional cage and, at the same time, may issue an instruction to the indicator controllers 3-1 to 3-4 to make the indicators indicate information pertaining to the elevator running condition in the case where the image generalizer 4 detects such a large number of waiting persons that persons will be left behind. Accordingly, waiting persons seeing the indicators 13-1 to 13-8 can wait without anxiety so that passengers can get on and off smoothly. Furthermore, the operations of continuously pushing door-opening buttons for increasing a door-opening period or the operations of opening and closing the elevator door by passengers or waiting persons can be reduced, so that each of the cages can start smoothly to the next floor. Consequently, elevator running efficiency can be improved.

Figure 19:
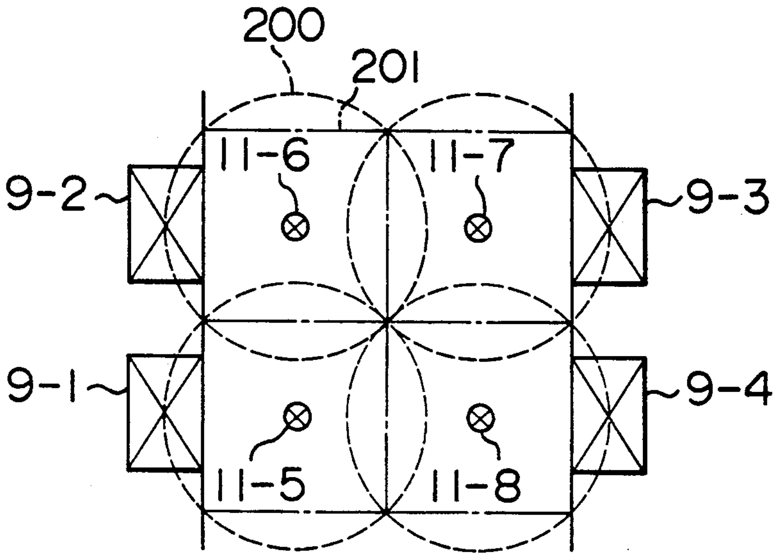
FIG. 19 is a diagram showing an example of the image pickup condition in the image pickup devices depicted in FIG. 18.

In the aforementioned configuration, the image pickup areas (broken lines) 200 of the image pickup devices 11-5 to 11-8 may be established to be overlapped with each other as shown in FIG. 19 to form processing areas (dot-and-dash lines) 201, so that waiting persons can be detected without omission.

Monitor television sets may be provided in the cages or halls so that image data can be displayed directly. As shown in FIG. 19, image data in the processing areas 201 of the image pickup devices 11-5 to 11-8 may be transmitted to the monitor 6 and displayed by dividing one screen on a monitor television set. In this case, the whole image of the hall can be observed at a glance.

Image pickup devices and image processors may be provided corresponding to the elevators and other image processors may be provided in the hall side so that the output results thereof are transmitted serially. In this case, not only signal cables between the halls and the machine chamber can be saved but an ordinary data quantity can be saved greatly.

Both information pertaining to the number of waiting persons calculated from the images and information pertaining to the direction of the running of the cages may be used to determine the traffic flow in the corresponding floor exactly, and, accordingly, to improve the traffic flow learning function thereof.

Because the image pickup areas of the image pickup devices are overlapped with each other, the image pickup devices can compensate for each other to some degree in the case where one of the image pickup devices is broken down. Accordingly, there arises an effect in that reliability on the system can be improved. Because the situation of the hall divided by the plurality of image pickup devices can be displayed as if it was picked up by one image pickup device, there arises an effect in that monitoring efficiency can be improved.

Because the plurality of image processors input images simultaneously according to the instruction given from the image generalizer 4, there is no mistake that one and the same person may be detected by a plurality of image processors. Accordingly, there arises an effect in that detecting accuracy of the image processors can be improved.

Because background images necessary for processing are taken into the image processors 12-1 to 12—12 according to the instruction issued by the group supervisory controller 1 after judgment of the optimum condition, there arises an effect in that detecting accuracy in the image processors can be improved.

Because signal transmission lines in the image information system are separated from signal lines used in the information indication system, there arises an effect in that stable and speedy image transmission can be carried out with no influence of the change of the data quantity on the information indication system.

Figure 20:
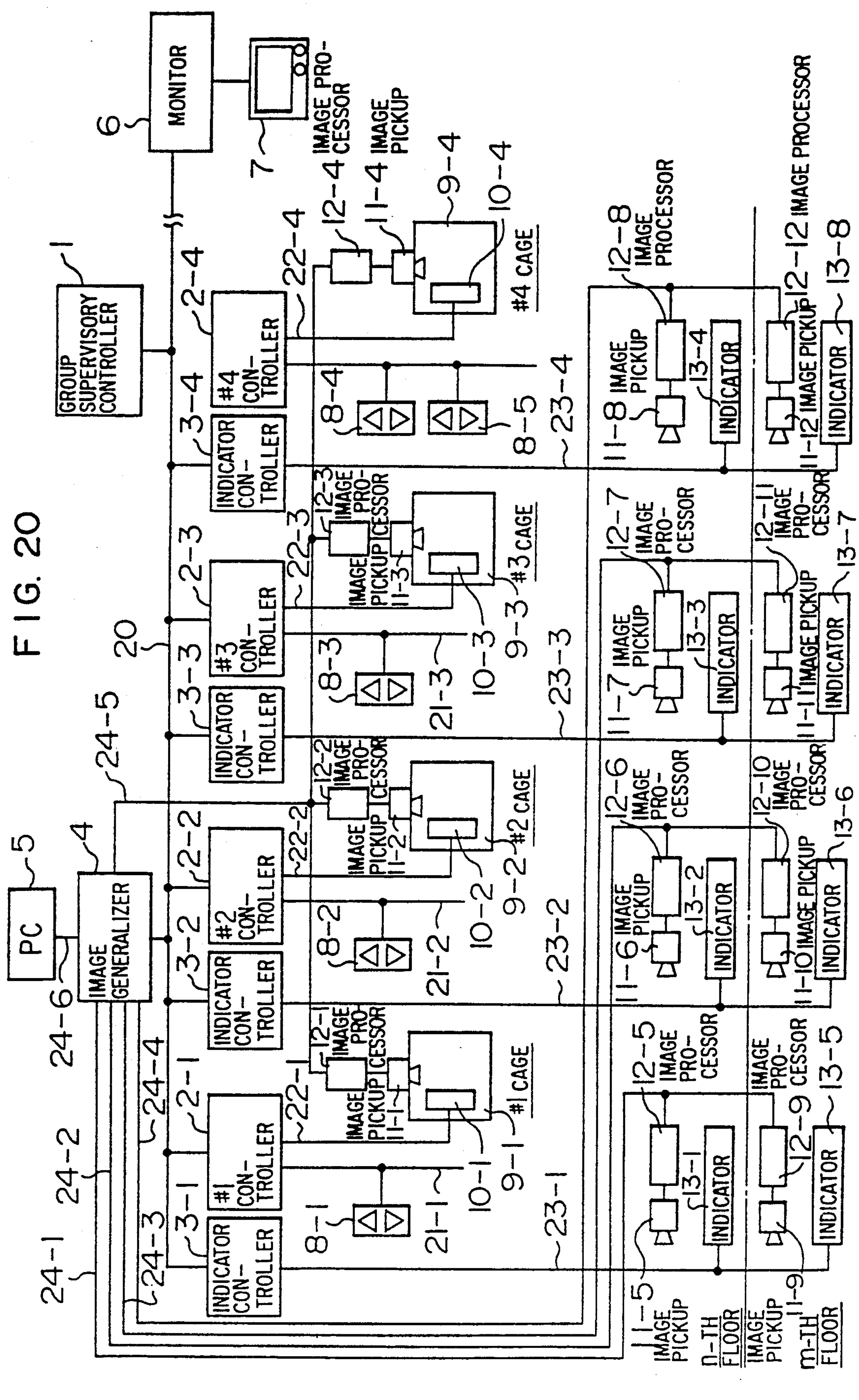
FIG. 20 is a diagram showing the whole configuration of the elevator control system as another embodiment in which special call buttons are provided in each hall.

FIG. 20 shows another embodiment of the invention related to the first mode.

This embodiment shown in FIG. 20 shows an elevator group supervisory control system having special call buttons 8-5, such as call buttons for disabled persons such as wheelchair users, port-type call buttons, code-type call buttons, or the like, other than the call buttons 8-1 to 8-4 provided in the respective floors in the aforementioned embodiment as shown in FIG. 1.

In general, call buttons for physically handicapped or disabled persons other than ordinary call buttons 8-1 to 8-4 are often provided in the elevator system in order to call a cage having a special interior suitable for physically handicapped or disabled persons in haste or control the opening and shutting of a door for the purpose of maintaining safety of physically handicapped or disabled persons. Or port-type call buttons are often provided to improve running efficiency through knowing the destination floor requested by uses in advance. Or code-type call buttons are often provided to limit users in the running pattern of the elevator. However, the special call buttons are often abused or misused by persons not related thereto to bring about a lowering of running efficiency.

In this embodiment, the operation of the special buttons is checked in the image information system to thereby prevent the lowering of running efficiency.

In FIG. 20, items equivalent to those in FIG. 1 are referenced correspondingly and description about them is omitted here.

In the following, the operation of the elevator system in this embodiment is described with reference to a flow chart shown in FIG. 21 in which items equivalent to those in FIG. 15 are referenced correspondingly and description about them is omitted here.

Figure 21:
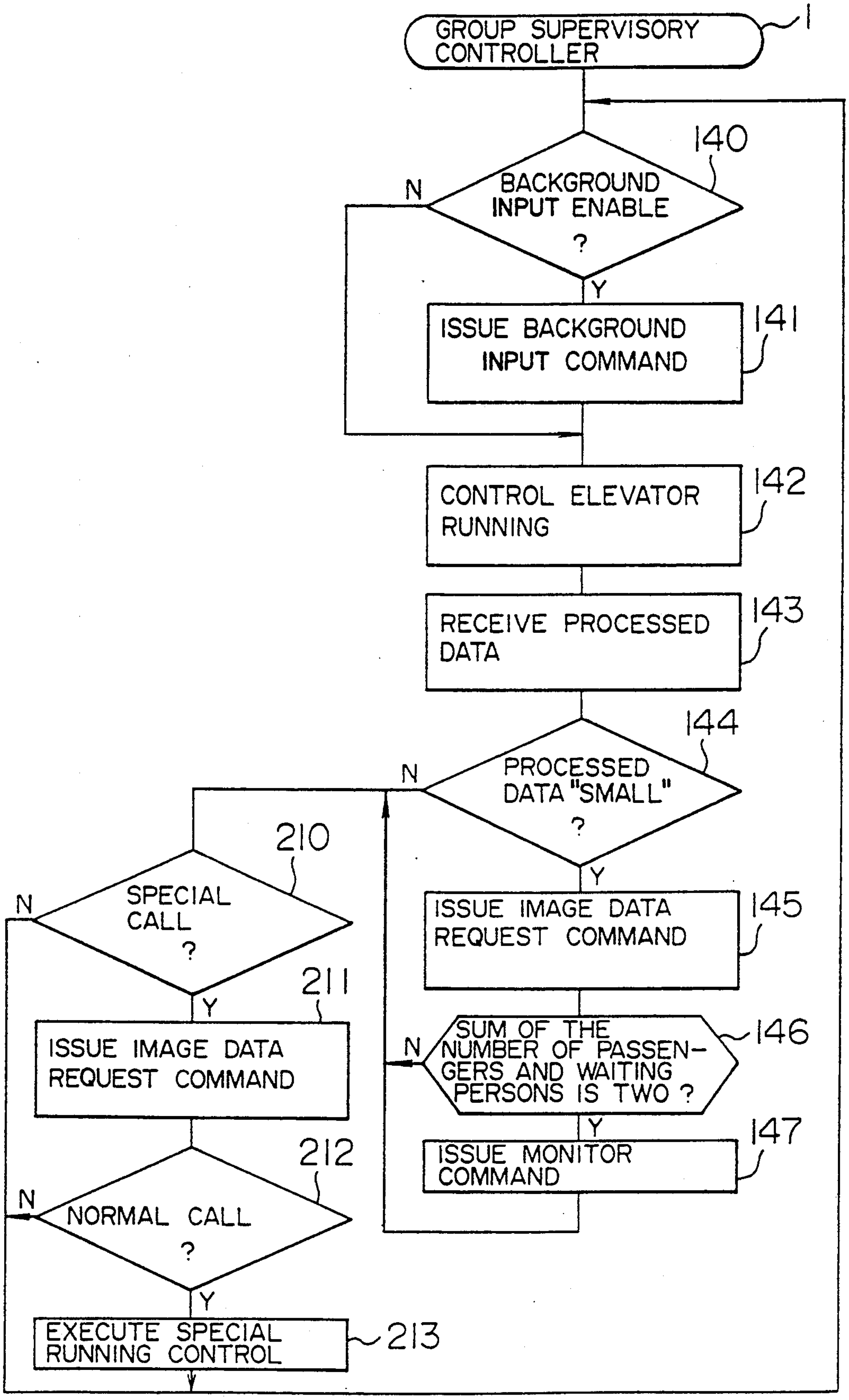
FIG. 21 is a flow chart showing the operation of the group supervisory controller depicted in FIG. 20.

In FIG. 21, a series of procedures designated by Step 210 to 213 is carried out before the situation of the procedure is returned to the head step after all steps in the series of procedures in the group supervisory controller 1 in FIG. 15 are finished. In Step 210, a judgment is made as to whether the special call button 8-5 is pushed or not. When the special call button is not pushed, the situation of the procedure is returned to the head step as in the conventional case. When the special call button is pushed, the image generalizer 4 obtains image data from a corresponding image processor and makes detailed image processing in Step 211. When a judgment of Step 212 proves that the calling is normal, the aforementioned special running of the elevator is carried out in Step 213. When a judgment in Step 212 proves that the calling is abnormal, the Step 213 is bypassed.

Table 3 shows special call buttons and processing by the image generalizer 4. For example, when a call button for disabled persons is pushed, a judgment is made as to whether a wheelchair exists in the image. The wheelchair detection can be made easily based on characteristic variables such as area, form, round length, and the like of an object seen from the ceiling. On the other hand, when a port-type call button is pushed, the number of callings and the number of persons existing in one scene are compared with each other. When a code-type call button is pushed, the characteristics of a person registered in advance and the characteristics of the person detected from an image are compared with each other.

TABLE 3

| Special call button | Contents of image processing |
|---|---|
| Call button for disabled persons | Checking wheelchair |
| Port-type call button | Comparing the number of calls and the number of persons |
| Code-type call button | Checking users |

According to this embodiment, the normality of the special calling can be judged in the group supervisory controller 1 based on the image recognition of original images in the image generalizer 4. Accordingly, lowering of running efficiency caused by reduction of the number of cages controlled by the group supervisory controller can be prevented, though the reduction of the number of cages is caused by priority of special-call running service to ordinary-call running service.

Figure 22:
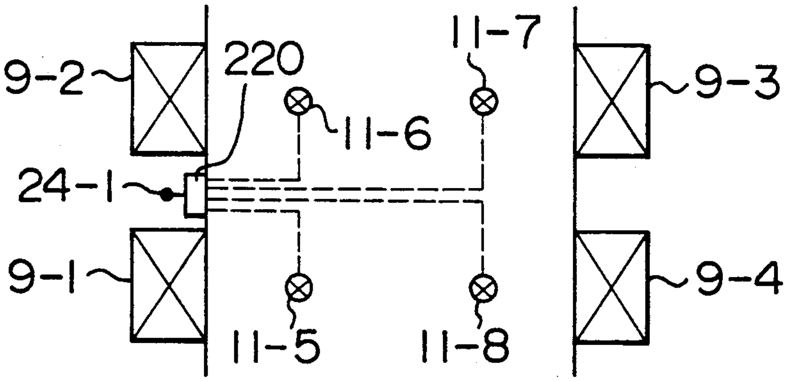
FIG. 22 is a diagram showing an example of connection between a plurality of image pickup devices and one image processor in one floor.

FIG. 22 shows another embodiment related to the arrangement of image pickup devices and image processors. In this embodiment, the output signals of image pickup devices provided in one and the same floor are collected into one place so that the output signals are transmitted through one transmission processing portion and one serial transmission line. In short, as shown in FIG. 22, the output signals of image pickup devices 11-5 to 11-8 are connected to an image processor in an elevator shaft by ceiling wiring as shown by the broken line, so that processed data and image data are transmitted to the image generalizer 4 through a serial transmission line 24-1.

Figure 23:
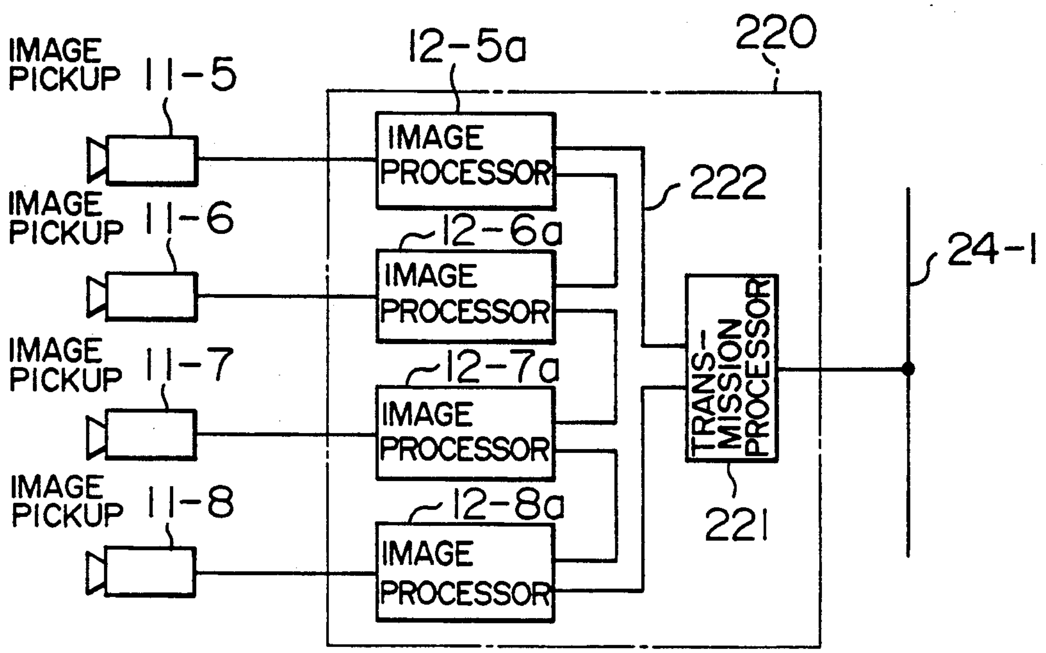
FIG. 23 is a diagram showing an example of the configuration of the image processor depicted in FIG. 22.

The configuration of the image processor 220 in FIG. 22 is shown in FIG. 23.

The output signals of the image pickup devices 11-5 to 11-8 are respectively connected to image processors **12-5*a* to 12-8*a* each of which comprises an image input portion and an image processing portion. The same image processing as that in the first embodiment is carried out. As a result, the signals are transmitted to one transmission processing portion 221 through a common bus 222, arranged in the transmission processing portion and then transmitted to the image generalizer 4 through the transmission line 24-1. Although the drawing shows the situation of an n-th floor, it is to be understood that the same structure can be applied to an m-th floor and that data can be transmitted through one serial transmission line. Accordingly, the number of transmission processing portions 4-3 to 4-6 provided in the hall side of the image generalizer 4 shown in FIG. 2** can be reduced to one.

According to this embodiment, not only the number of serial transmission lines can be reduced to one but the number of transmission processing portions in the image processors **12-5*a* to 12-8*a* and the image generalizer 4** can be reduced. Accordingly, there arises an effect in that improvement in construction work and reduction of system size can be attained.

Figure 24:
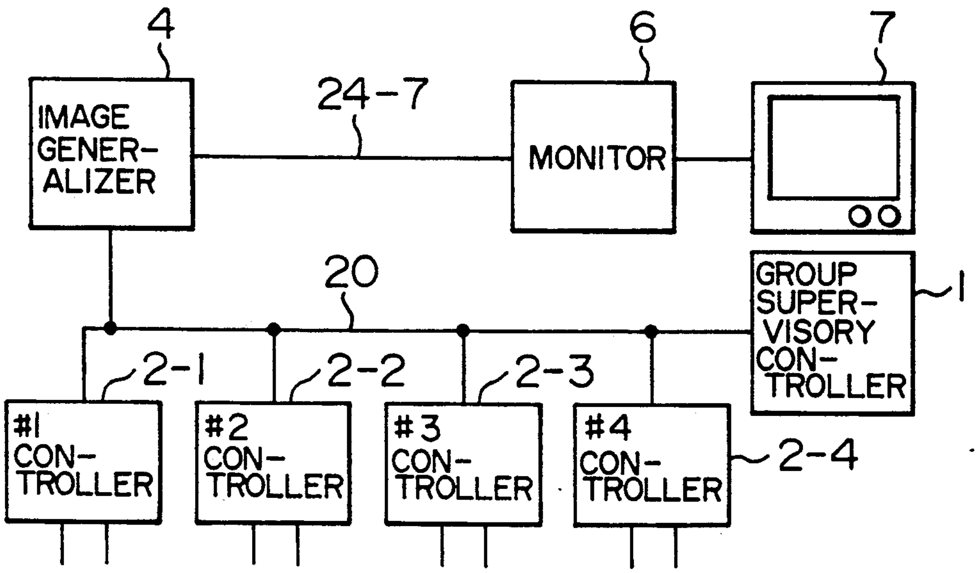
FIG. 24 is a diagram showing another embodiment related to the monitor in the elevator control system depicted in FIG. 1.

FIG. 24 shows another embodiment related to the monitor.

In this embodiment, an exclusive-use serial transmission line 24-7 for connecting between the image generalizer 4 and the monitor 6 is provided. In short, processed data and image data transmitted from the image processors 12-1 to 12—12 are arranged in the image generalizer 4, so that the processed data necessary for elevator control are fed to the transmission line 20 and the image data necessary for monitoring are fed to the serial transmission line 24-7. It is therefore not necessary that image be transmitted as a multiplex signal to the transmission line 20 at the time of monitoring. Accordingly, there is no reduction of efficiency in transmission of information pertaining to elevator control.

According to this embodiment, as described above, there is no reduction of efficiency in transmission of information pertaining to elevator control. Furthermore, the misoperation of the elevator caused by multiplex transmission of image data can be prevented.

Figure 25:
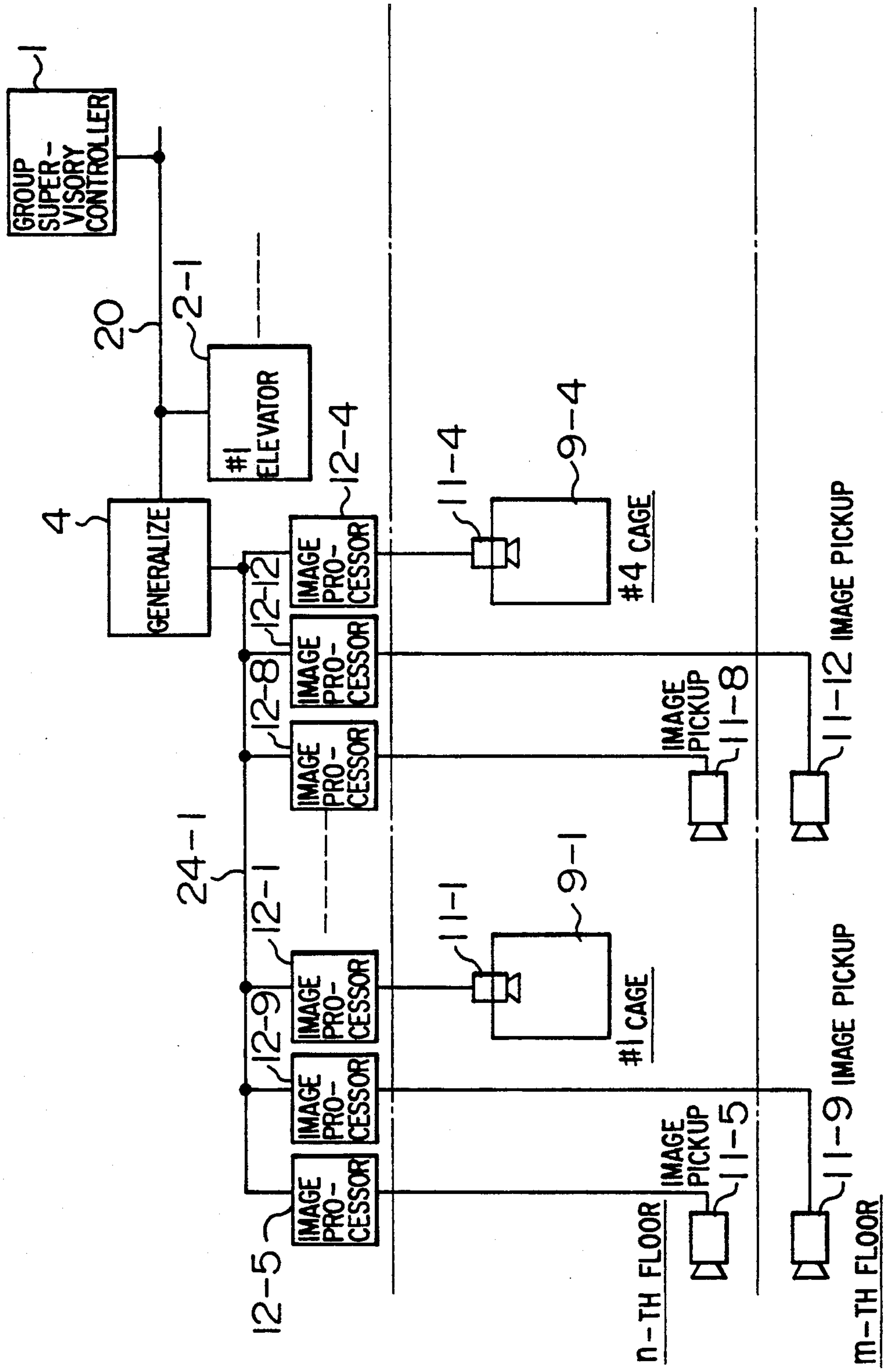
FIG. 25 is a diagram showing another embodiment related to the setting of the image processors in the elevator control system depicted in FIG. 1.

FIG. 25 shows another embodiment related to locations of the image processors.

In this embodiment, all of the image processors 12-1 to 12—12 are provided in the machine chamber.

This embodiment can be applied to a relatively low building.

In short, in the case where the image processors 12-1 to 12—12 are provided in the hall-side elevator shafts as in the embodiment shown in FIG. 1, installation or checking work involves on-cage dangerous work. According to this embodiment, all of the image processors 12-1 to 12—12 are provided in the machine chamber and connected to one serial transmission line 24-1. Accordingly, the same image processing as in the embodiment shown in FIG. 1 can be made. Furthermore, safety at the time of the installation and checking of the elevator can be improved. In addition, the tuning of every image processor can be made easily.

Another embodiment of the present invention will be described hereunder with reference to FIGS. 26 and 27.

In general, a differential-transformer-type load weight detector for detecting load weight is provided under the floor of every elevator cage. The elevator controller performs control of the elevator carrying a full load of passengers by using the output of the load weight detector. When, for example, the elevator carries such a full load of passengers that no person can get on the elevator, the elevator controller is designed to control the elevator to pass the cage without stopping at a floor designated by a hall-call. The accuracy in the output of the load weight detector is considered to be $\pm 10$relative to the number of persons.

In the previous embodiment, disagreement between the situation of pushing of the call button and the result of image processing by each image processor is used as a trigger for starting the detailed image processing by the image generalizer. In this embodiment, disagreement between the result of detection by the load weight detector and the result of image processing by the image processor for the cage is used as a trigger for starting the detailed image processing. In short, the result of detection by the load weight detector is used as other information pertaining to passengers.

In the following, the configuration of this embodiment is described with reference to FIG. 26.

Figure 26:
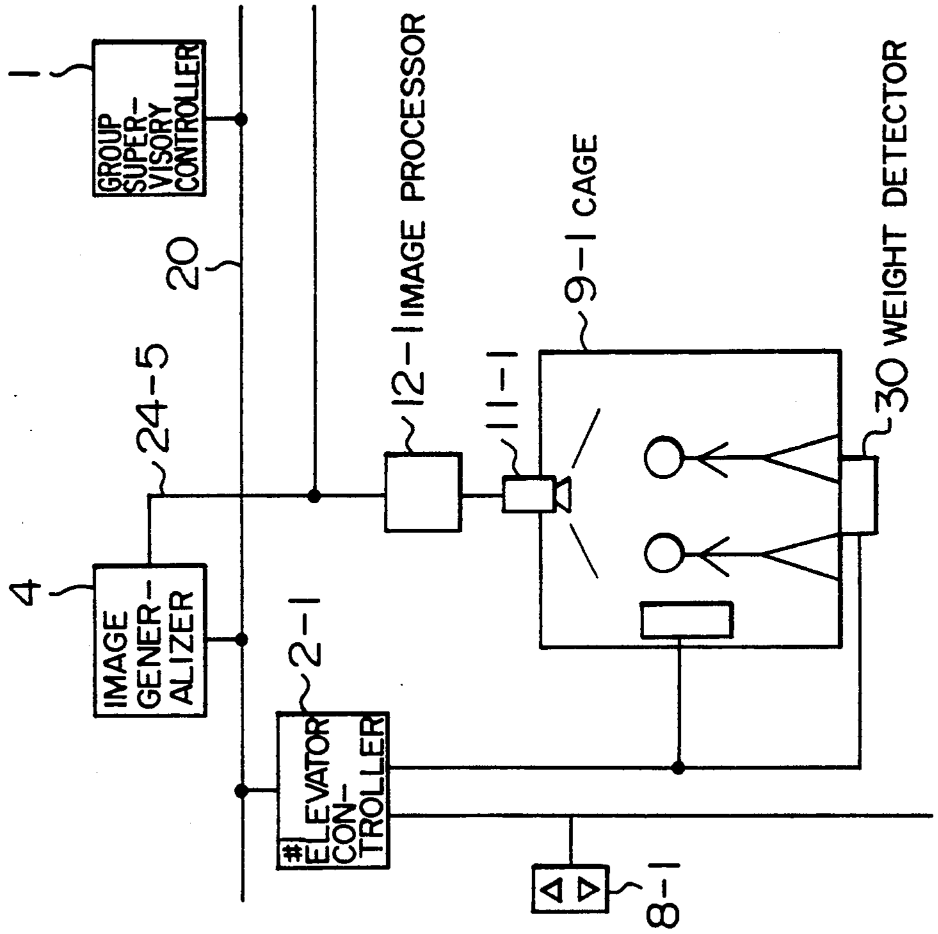
FIG. 26 is a diagram showing the relationship between one cage, the image generalizer and the group supervisory controller in another embodiment of the invention.
Figure 27:
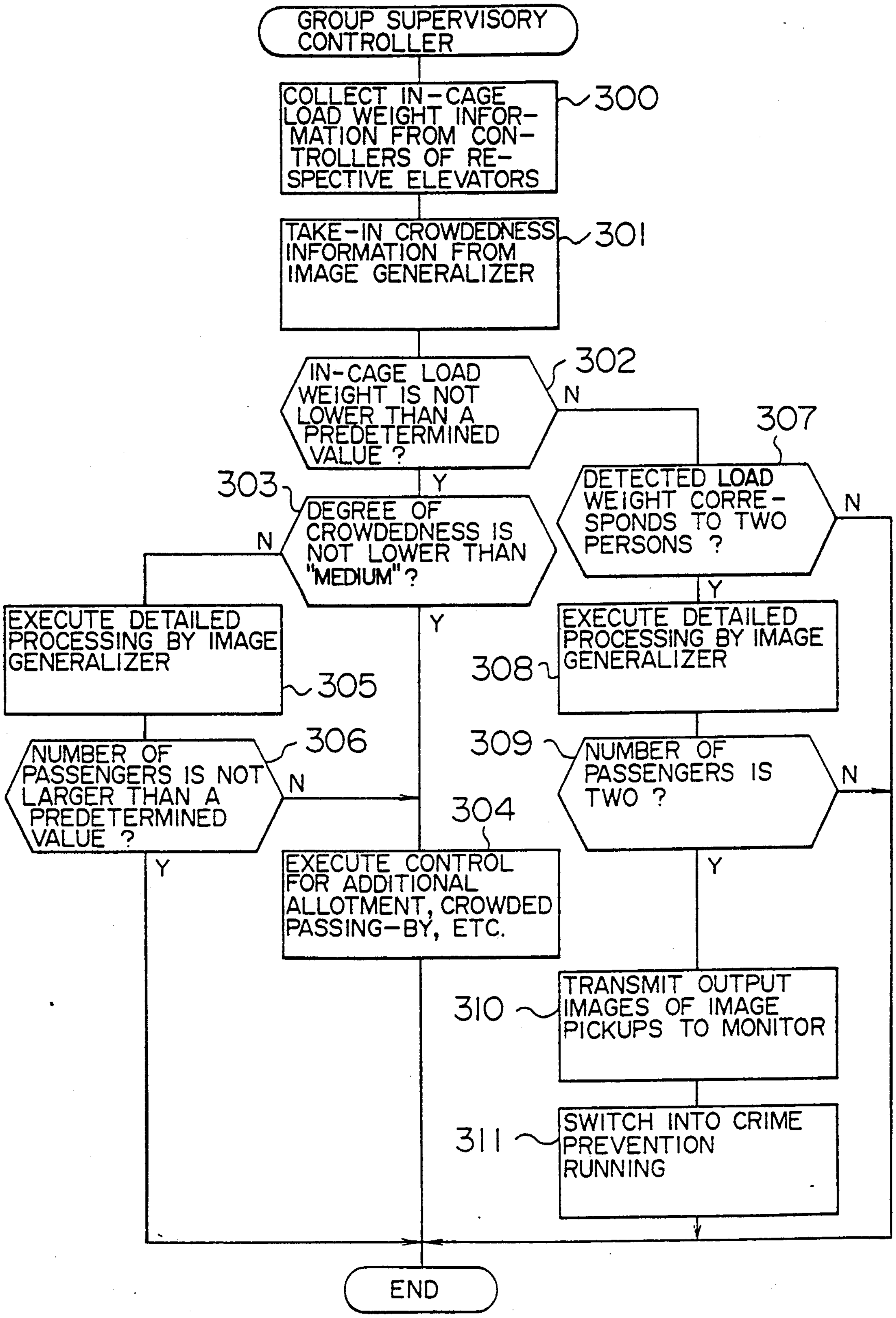
FIG. 27 is a flow chart showing the operation of the group supervisory controller in the embodiment depicted in FIG. 26.

FIG. 26 shows a typical example of the load weight detector provided in the No. 1 elevator.

The load weight detector 30 is provided under the floor of a cage 9-1. The output of the load weight detector 30 is transmitted to the individual elevator controller 2-1. After arranging elevator information such as intra-cage load weight and the like, the controller 2-1 transmits the arranged information to the group supervisory controller 1 through the transmission line 20. On the other hand, an image in the cage 9-1 picked up by the image pickup device 11-1 is processed by the image processor 12-1, so that the degree of crowdedness in the cage is transmitted to the image generalizer 4. The image generalizer 4 arranges the thus obtained information with information obtained from other image processors and transmits the arranged information to the group supervisory controller 1 through the transmission line 20. The group supervisory controller 1 makes a comparison between the intra-cage load weight (obtained by the load weight detector 30) obtained from the individual elevator controller 2-1 and the degree of intra-cage crowdedness (obtained by the image processor 12-1) obtained from the image generalizer. On the basis of the comparison, the group supervisory controller 1 performs elevator optimum assignment control in a flow chart shown in FIG. 27.

In the following, the flow of procedure is described with reference to FIG. 27.

In Steps 300 and 301, information pertaining to intra-cage load weight and information pertaining to crowdedness are collected from the individual elevator controllers 2-1 to 2-4 and the image generalizer 4 in the manner as described above. Then, a judgment in Step 302 is made as to whether the intra-cage load weight detected by the load weight detector 30 is more than a predetermined value or not.

When the result of the judgment is true (Y), a judgment in Step 303 is made as to whether the degree of intra-cage crowdedness is not less than "medium." In short, the output of the load weight detector 30 and the result of image processing by the image processor 12-1 are compared with each other in Steps 302 and 303 in the case where the number of passengers is large. When, for example, the judgment in Step 303 proves that the degree of crowdedness is not less than "medium", the result of the judgment in Step 303 agrees with the result of the judgment in Step 302. Accordingly, the group supervisory controller 1 performs elevator control such as additional assignment, passing by of the elevator because of the elevator carrying a full load of passengers, and the like in Step 304 without performing detailed image processing by the image generalizer 4. When for example, the judgment in Step 303 proves that the degree of crowdedness is not more than "small", the result of the judgment in Step 303 disagrees with the result of the judgment in Step 302. Accordingly, the group supervisory controller 1 issues an instruction to the image generalizer 4 to perform detailed image processing in Step 305. In Step 306, a judgment is made as to whether the number of passengers is less than a predetermined value or not. When the result of the judgment is true (Y), the group supervisory controller makes a decision that load weight is considerably heavy but some passengers can still get on. When the result of the judgment in Step 306 is false (N), the aforementioned Step 304 is carried out.

On the other hand, when the result of the judgment in Step 302 is false (N), or in other words, when the intra-cage load weight is less than a predetermined value, a judgment in Step 307 is made as to whether the intra-cage load weight corresponds to two persons or not. When the result of the judgment in Step 307 is true (Y), an image of the inside of the cage is processed in detail by the image generalizer 4 in Step 308. From the result of Step 308, a judgment in Step 309 is made as to whether the number of passengers is two or not. When the result of the judgment is true (Y), the image of the cage picked up by the image pickup device 11-1 is transmitted to the monitor as shown in FIG. 1 in Step 310 and then the running pattern is switched to crime-prevention running to stop the cage at every floor in Step 311. When any one of the results of the judgments in Steps 307 and 309 is false (N), ordinary running control is continued.

According to this embodiment, wasteful stopping of not-acceptable cages and passing of acceptable cages can be eliminated, thereby attain improvement in running efficiency. In addition, the elevator control system can be improved in crime prevention.

In the following, adjustment and checking of image processors in the second mode are described.

At the time of the starting of the system or at the time of the periodical checking of the system, it is necessary to carry out the adjusting operation for setting (or updating) various parameters or determining processing areas in all of the image processors 12-1 to 12—12 or the operation for checking the running condition. This mode is provided for the aforementioned case. This mode is started by connecting the PC 5 to the general communication circuit 24-6 of the image generalizer 4 and a monitor television set *7a* to the image output portion 4-8 as shown in FIG. 2.

When a command as shown in Table 4 is issued from the PC 5 in FIG. 2, the MPU in the image processing portion 4-1 logically cuts off the transmission processing portion 4-2 in interrupt handling and carries out tuning between the plurality of image processors 12-1 to 12—12.

TABLE 4

| Command | Sub-command | Parameter | Contents of Processing |
|---|---|---|---|
| A | 1 | AD,l | Read-out l bytes from address AD. |
| | 2 | | Write-in l bytes from address AD. |
| B | — | $X_1,Y_1$ $X_2,Y_2$ | Regard an area formed by diagonal points $(X_1,Y_2)$ and $(X_2,Y_2)$ as a processing area. |
| C | 1 | P | Take-in background image and store the image in page P. |
| | 2 | | Take-in original image and store the image in page P. |
| | 3 | | Extract differential image and store the image in page P. |
| | 4 | $P_1,P_2$ | Convert the image in page $P_1$ into a binary image and store the binary image in page $P_2$. |
| | 5 | P | Find the rate occupied by "white" from the binary image in page P |
| | 6 | — | Transmit processed data. |
| D | 1 | P | Receive the image in page P. |
| | 2 | | Transmit the image in page P. |
| E | — | — | Terminate the tuning procedure. |

In the following, this procedure is described with reference to a flow chart shown in FIG. 28.

Figure 28:
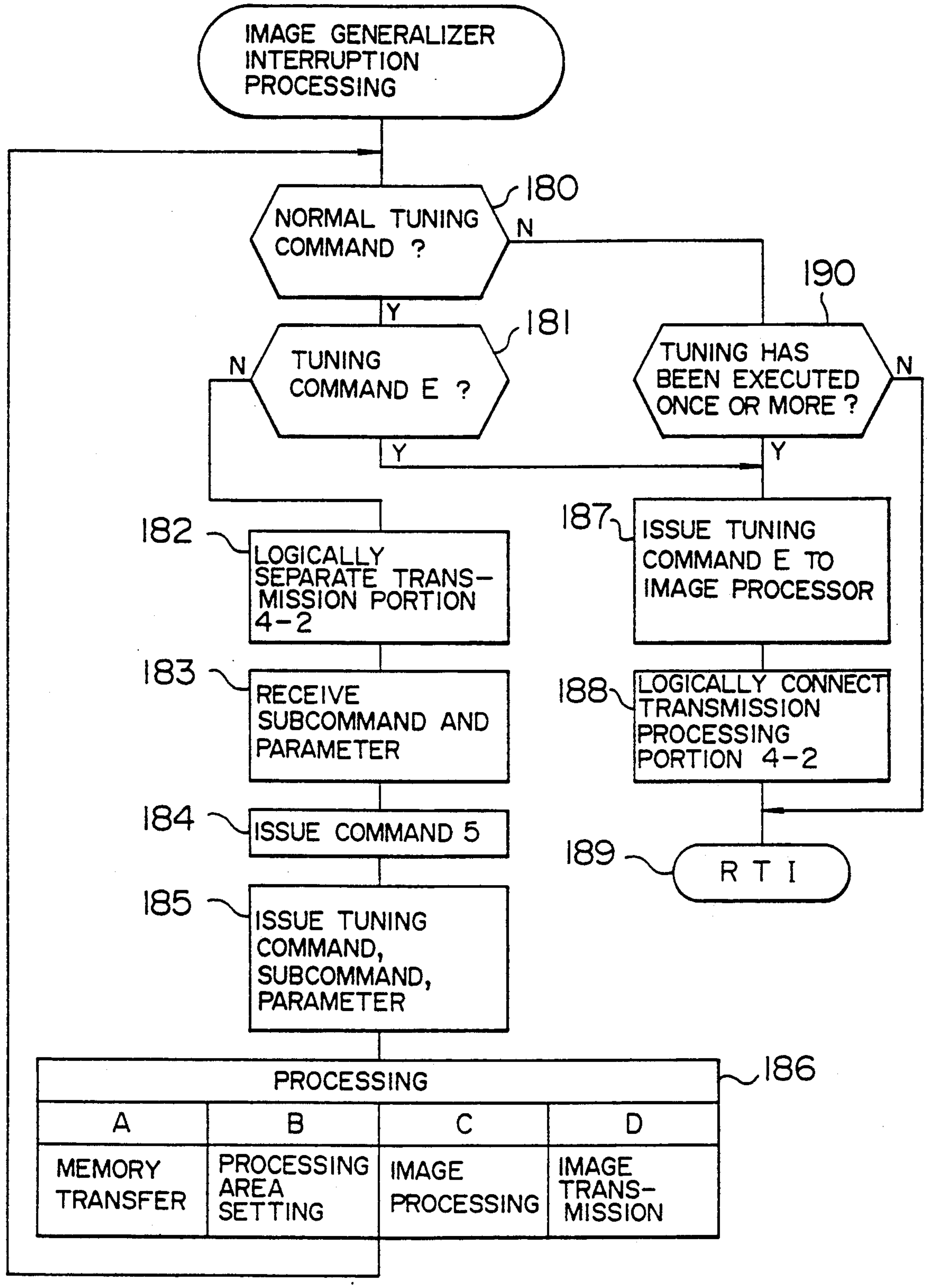
FIG. 28 is a flow chart showing the operation of the image generalizer in the case where the image processors in the elevator control system depicted in FIG. 1 are adjusted or checked.

FIG. 28 shows interrupt handling with respect to the general communication circuit 24 of the image generalizer 4.

In Step 180, judgment is made as to whether data from the general communication circuit 24-6 includes the normal tuning commands A to E or not. When the data is normal, judgment in Step 181 is made as to whether the tuning command is "E" or not.

When the tuning command is not "E", the transmission processing portion 4-2 is logically cut off in Step 182 and at the same time the fact is reported to the group supervisory controller 1. This can be made easily by writing specific information in the processed data storage areas 120 to 131 of the DPRAM in the transmission processing portion 4-2 as shown in FIG. 12. Then, a sub-command and a parameter are received from the PC 5 in Step 183. Command No. 5 is issued to all of the image processors 12-1 to 12—12 in Step 184. Then, the tuning command, sub-command and parameter are issued in Step 185. In Step 186, processing corresponding to the tuning command is carried out. The aforementioned series of procedures is repeated. When the command from the PC 5 is estimated in Step 181 to be a tuning command "E", the image generalizer 4 issues the tuning command "E" to all of the image processors 12-1 to 12—12 in Step 187 to thereby report the finishing of the tuning procedure. Thereafter, the image generalizer logically connects the transmission processing portion 4-2 in Step 188. In Step 189, the interrupt handling is finished. When the result of the judgment in Step 180 proves that the tuning command obtained from the PC is not normal, judgment in Step 190 is made as to whether the tuning procedure has been executed once or more. When the result of the judgment proves that the tuning procedure has been executed, the aforementioned steps 187 and 188 are carried out and then the interrupt handling is finished in Step 189.

When the tuning procedure has been not executed, the steps 187 and 188 are bypassed so that the interrupt handling is finished in Step 189. On the other hand, when the command is estimated from Step 172 in FIG. 17 to be command No. 5, the respective image processor carries out processing corresponding to Step 186 in FIG. 28 until the tuning command "E" is issued in Step 176 in FIG. 17.

In the aforementioned processing, a menu of tuning commands, a processing command input message and transmission/reception data are displayed on a display unit of the PC 5. Transmission/reception image data are displayed on the television set *7a*. A building manager can judge by comparison between the data on the PC 5 and the original image data on the monitor television set *7a* whether the image processor 12-5 is operating normally or not.

According to the second mode, the tuning of the image processor 12-5 can be made efficiently by using the original image stored in the image processor 12-5.

Having described the first and second modes in the case where the image generalizer 4 uses the original image stored in the work memory 67, the invention is applicable to the case where image signals obtained by the image pickup devices 11-1 to 11-12 are directly transmitted to the image generalizer 4 to thereby perform image processing based on the images. This reason is that, when there is a sufficient time difference between the image processing by the image generalizer 4 and the image processing by each of the image processors 12-1 to 12—12, the change of the image is little.

We claim:

1. An elevator control system for controlling movement of cages up and down in elevator shafts of a building, comprising:

image pickup means provided in at least one of the inside of each cage and the landing place of each floor of said building where a corresponding one of said cages stops;

first image processing means for processing images picked up by said image pickup means to obtain first information indicative of at least one of (a) presence/absence of passengers in said cages, (b) presence/absence of persons waiting for said cages, (c) a quantity of passengers in said cages, and (d) a quantity of persons waiting for said cages; and second image processing means having an image processing level higher than the image processing level of said first image processing means; and elevator control means including means for detecting at least one of (a) presence/absence of passengers in said cages, (b) presence/absence of persons waiting for said cages, (c) a quantity of passengers in said cages, and (d) a quantity of persons waiting for said cages, means for determining whether a discrepancy exists between an output of said detecting means and said first information obtained by said first image processing means, means for causing said second image processing means to process an image processed by said first image processing means and resulting in a discrepancy to obtain second information indicative of at least one of (a) presence/absence of passengers in said cages, (b) presence/absence of persons waiting for said cages, (c) a quantity of passengers in said cages, and (d) a quantity of persons waiting for said cages when said determining means determines that a discrepancy exists, and means for controlling movement of said cages based on said first information obtained by said first image processing means when said determining means determines that a discrepancy does not exist, and for controlling movement of said cages based on said second information obtained by said second image processing means when said determining means determines that a discrepancy does exist.

2. An elevator control system according to claim 1, in which said first and second image processing means calculate the number of passengers in each of said cages and the number of waiting persons in each of said landing places based on image processing.

3. An elevator control system according to claim 2, in which the number of passengers and the number of waiting persons are calculated as to a group of grown-ups and a group of children respectively.

4. An elevator control system according to claim 1, in which said first image processing means performs image processing while classifying each of the number of passengers and the number of waiting persons into at least four groups, namely, "no person", "a small number of persons", "a medium number of persons", and "a large number of persons".

5. An elevator control system according to claim 1, in which the image processing to be performed by said second image processing means is designated by a selected one of (1) said elevator control means and (2) said second image processing means.

6. An elevator control system according to claim 5, in which a call button is provided in each landing place, and in which the selected one of (1) said elevator control means and (2) said second image processing means includes means for causing said second image processing means to perform image processing when a number of times said call button has been pushed is larger than the number of waiting persons in the corresponding landing place detected by said first image processing means.

7. An elevator control system according to claim 5, in which a call button is provided in each landing place, and in which the selected one of (1) said elevator control means and (2) said second image processing means includes means for causing said second image processing means to perform image processing when at least one waiting person is detected in a landing place by said first image processing means and the corresponding call button has not been pushed.

8. An elevator control system according to claim 5, in which a special call button is provided in at least one of each landing place and the inside of each cage, and in which the selected one of (1) said elevator control means and (2) said second image processing means includes means for causing said second image processing means to perform image processing when said special call button is pushed.

9. An elevator control system according to claim 8, in which said special call button serves as a call button for a disabled person, and in which said first and second image processing means provide images for determining whether said disabled person is in a wheelchair or not.

10. An elevator control system according to claim 1, in which said elevator control means further includes individual elevator control means for controlling the respective cages and group supervisory means for performing general control of said individual elevator control means, and in which said group supervisory means includes means for causing said second image processing means to perform image processing.

11. An elevator control system according to claim 10, in which when said second image processing means detects too many waiting persons in a landing place of a floor to be served by one cage, said group supervisory means apportions at least two cages to corresponding landing places of the same floor.

12. An elevator control system according to claim 1, in which indicators are provided in respective landing places and indicator control means for controlling the contents of said indicators are connected to said elevator control means, and in which said indicator control means provides instructions to said indicators for display based on information pertaining to running patterns of the cages and waiting persons in the respective landing places.

13. An elevator control system according to claim 12, in which said indicator control means causes said indicators to display information pertaining to the running patterns of the respective cages.

14. An elevator control system according to claim 13, in which said indicator control means causes said indicators to display pictorial patterns when at least one of said first and second image processing means detects the presence of at least one child.

15. An elevator control system according to claim 1, in which a plurality of image pickup means are connected to said first image processing means.

16. An elevator control system for controlling movement of cages up and down in elevator shafts of a building, comprising:

image pickup means provided in at least one of the inside of each cage and the landing place of each floor of said building where a corresponding one of said cages stops;

image processing means for processing images picked up by said image pickup means with a first image processing level to obtain first information indicative of at least one of (a) presence/absence of passengers in said cages, (b) presence/absence of persons waiting for said cages, (c) a quantity of passengers in said cages, and (d) a quantity of persons waiting for said cages, and for processing images picked up by said image pickup means with a second image processing level higher than said first image processing level to obtain second information indicative of at least one of (a) presence/absence of passengers in said cages, (b) presence/absence of persons waiting for said cages, (c) a quantity of passengers in said cages, and (d) a quantity of persons waiting for said cages; and elevator control means including means for detecting at least one of (a) presence/absence of passengers in said cages, (b) presence/absence of persons waiting for said cages, (c) a quantity of passengers in said cages, and (d) a quantity of persons waiting for said cages, means for determining whether a discrepancy exists between an output of said detecting means and said first information obtained by using said first image processing level, means for causing said image processing means to process, by using said second image processing level, an image processed by using said first image processing level and resulting in a discrepancy to obtain said second information when said determining means determines that a discrepancy exists, and means for controlling movement of said cages based on said first information obtained by using said first image processing level when said determining means determines that a discrepancy does not exist, and for controlling movement of said cages based on said second information obtained by using said second image processing level when said determining means determines that a discrepancy does exist.

17. An elevator control system for controlling movement of cages up and down in elevator shafts of a building comprising:

image pickup means provided in the inside of each cage and in the landing place of each floor of said building where a corresponding one of said cages stops;

image processing means for processing images picked up by said image pickup means with first and second image processing levels different from each other, said second image processing level being higher than said first image processing level; and elevator control means including every-floor stop means for confirming the fact that the number of passengers in a cage has become two on the basis of the image processing by using said second image processing level in the case where it is expected that the number of passengers in said cage will become two on the basis of the image processing by using said first image processing level, and for controlling said cage to stop at every floor from the point of time when the number of passengers in said cage has become two to the point of time when said cage reaches a floor designated by the passengers in said cage.

18. An elevator control system for controlling movement of cages up and down in elevator shafts of a building, comprising:

a plurality of image pickup means provided in landing places of floors of said building where said cages stop;

a plurality of first image processing means equal in number to said plurality of image pickup means for processing images picked up by respective ones of said plurality of image pickup means to obtain first information indicative of at least one of (a) presence/absence of passengers in said cages, (b) presence/absence of persons waiting for said cages, (c) a quantity of passengers in said cages, and (d) a quantity of persons waiting for said cages;

second image processing means connected to said plurality of first image processing means for processing images picked up by all of said plurality of image pickup means to obtain second information indicative of at least one of (a) presence/absence of passengers in said cages, (b) presence/absence of persons waiting for said cages, (c) a quantity of passengers in said cages, and (d) a quantity of persons waiting for said cages;

a transmission line for connecting each of said first image processing means to said second image processing means so as to transmit images processed by each of said first image processing means and images picked up by each of said plurality of image pickup means to said second image processing means; and elevator control means including means for detecting at least one of (a) presence/absence of passengers in said cages, (b) presence/absence of persons waiting for said cages, (c) a quantity of passengers in said cages, and (d) a quantity of persons waiting for said cages, means for determining whether a discrepancy exists between an output of said detecting means and said first information obtained by each of said first image processing means, means for causing said second image processing means to process an image processed by one of said first image processing means and resulting in a discrepancy to obtain said second information when said determining means determines that a discrepancy exists, and means for controlling movement of said cages based on said first information obtained by each of said first image processing means when said determining means determines that a discrepancy does not exist, and for controlling movement of said cages based on said second information obtained by said second image processing means in place said first information obtained by said one of said first image processing means when said determining means determines that a discrepancy does exist.

19. An elevator control system according to claim 18, in which said plurality of first image processing means are connected to said second image processing means through a common transmission line, and in which said second image processing means is connected to said elevator control means through another transmission line.

20. An elevator control system according to claim 18, in which image display means is connected to said second image processing means so that images obtained by each of said image pickup means are transmitted from said second image processing means to said image display means so as to be displayed by the image display means.

21. An elevator control system according to claim 18, in which each of said first image processing means includes means for storing an image processed by said first image processing means as an original image to be processed by said second image processing means.

22. An elevator control system for controlling movement of cages up and down in elevator shafts of a building, comprising:

image pickup means provided in the inside of each of said cages and in landing places of each floor of said building where said cages stop;

a plurality of first image processing means for processing images picked up by said image pickup means to obtain first information indicative of at least one of (a) presence/absence of passengers in said cages, (b) presence/absence of persons waiting for said cages, (c) a quantity of passengers in said cages, and (d) a quantity of persons waiting for said cages;

second image processing means for processing images picked up by said image pickup means at a higher level than that of said first image processing means to obtain second information indicative of at least one of (a) presence/absence of passengers in said cages, (b) presence/absence of persons waiting for said cages, (c) a quantity of passengers in said cages, and (d) a quantity of persons waiting for said cages;

a first transmission line for connecting each of said first image processing means to said second image processing means;

indicators provided in said landing places;

indicator control means for causing said indicators to display information such as running conditions of said cages and waiting persons in said landing places;

image display means for displaying the situation of waiting persons in the respective landing places and passengers in said cages by means of images obtained by said image pickup means;

elevator control means including means for detecting at least one of (a) presence/absence of passengers in said cages, (b) presence/absence of persons waiting for said cages, (c) a quantity of passengers in said cages, and (d) a quantity of persons waiting for said cages, means for determining whether a discrepancy exists between an output of said detecting means and said first information obtained by each of said first image processing means, means for causing said second image processing means to process an image processed by one of said first image processing means and resulting in a discrepancy to obtain said second information when said determining means determines that a discrepancy exists, and means for controlling movement of said cages based on said first information obtained by each of said first image processing means when said determining means determines that a discrepancy does not exist, and means for controlling movement of said cages based on said second information obtained by said second image processing means in place of said first information obtained by said one of said first image processing means when said determining means determines that a discrepancy does exist; and a second transmission line for connecting said elevator control means, said second image processing means, said indicator control means, and said image display means to each other.

23. An elevator control system for controlling movement of cages up and down in elevator shafts of a building comprising:

image pickup means provided in the inside of said cages;

first image processing means for processing images picked up by said image pickup means to obtain first information indicative of a quantity of passengers in said cages;

second image processing means having an image processing level higher than that of said first image processing means for processing images picked up by said image pickup means to obtain second information indicative of a quantity of passengers in said cages;

load weight detecting means provided under respective bottoms of said cages for detecting load weights of said cages and producing third information indicative of a quantity of passengers in said cages based on the detected load weights; and elevator control means including means for controlling movement of said cages based on said first information obtained by said first image processing means when said first information obtained by said first image processing means substantially agrees with said third information produced by said load weight detecting means, and means for controlling movement of said cages based on said second information obtained by said second image processing means when said first information obtained by said first image processing means disagrees with said third information produced by said load weight detecting means.

24. An elevator control system according to claim 23, in which said load weight detecting means is made higher in accuracy than said first image processing means relative to the quantity of passengers in said cages, and in which said second image processing means is made higher in accuracy than said load weight detecting means relative to the quantity of passengers in said cages.

25. An elevator control system according to claim 23, in which the comparison between said first information obtained by said first image processing means and said third information produced by said load weight detecting means is carried out when said third information produced by said load weight detecting means is indicative of a quantity of passengers representing less than a medium degree of crowdedness.

26. An elevator control system according to claim 16, wherein said image processing means includes a plurality of first image processing means equal in number to said image pickup means for processing images picked up by respective ones of said image pickup means by using said first image processing level, said plurality of first image processing means being provided in at least one of the inside of each cage and the landing place of each floor of said building where a corresponding one of said cage stops; and second image processing means connected to said plurality of first image processing means for processing images picked up by all of said image pickup means by using said second image processing level, said second image processing level being more accurate than said first image processing level, said second image processing means being provided in a machine chamber of said elevator control system.

* * * * *